United States Patent
Nakayama et al.

(10) Patent No.: US 8,984,263 B2
(45) Date of Patent: Mar. 17, 2015

(54) INFORMATION PROCESSING DEVICE AND EMULATION PROCESSING PROGRAM AND METHOD

(75) Inventors: Takashi Nakayama, Kawasaki (JP); Kazuyoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 13/253,640

(22) Filed: Oct. 5, 2011

(65) Prior Publication Data

US 2012/0089822 A1  Apr. 12, 2012

(30) Foreign Application Priority Data

Oct. 12, 2010 (JP) ................................ 2010-230015

(51) Int. Cl.
- G06F 15/00 (2006.01)
- G06F 9/30 (2006.01)
- G06F 9/40 (2006.01)
- G06F 9/455 (2006.01)
- G06F 9/32 (2006.01)
- G06F 9/38 (2006.01)

(52) U.S. Cl.
CPC .......... *G06F 9/45554* (2013.01); *G06F 9/3017* (2013.01); *G06F 9/32* (2013.01); *G06F 9/3802* (2013.01)
USPC ........................................................ 712/227

(58) Field of Classification Search
None
See application file for complete search history.

(56) References Cited

U.S. PATENT DOCUMENTS

| | | | | |
|---|---|---|---|---|
| 4,720,784 A * | 1/1988 | Radhakrishnan et al. | ..... | 710/107 |
| 5,140,687 A * | 8/1992 | Dye et al. | .......... | 703/23 |
| 5,574,873 A * | 11/1996 | Davidian | ........ | 712/200 |
| 6,988,261 B2 * | 1/2006 | Sokolov et al. | .............. | 717/118 |
| 7,428,485 B2 | 9/2008 | Armstrong et al. | | |
| 7,487,341 B2 * | 2/2009 | Wang et al. | .................. | 712/244 |
| 7,962,900 B2 * | 6/2011 | Barraclough et al. | ........ | 717/128 |
| 8,402,260 B2 * | 3/2013 | Mizumoto | ........ | 713/2 |

FOREIGN PATENT DOCUMENTS

| | | |
|---|---|---|
| JP | 2004-21890 A | 1/2004 |
| JP | 2004-127154 A | 4/2004 |
| JP | 2005-501333 A | 1/2005 |
| JP | 2006-268487 A | 10/2006 |

* cited by examiner

*Primary Examiner* — Corey S Faherty
(74) *Attorney, Agent, or Firm* — Staas & Halsey LLP

(57) ABSTRACT

An emulation processing method causing a computer including a first and a second processor to execute emulation processing, the emulation processing method includes: calculate a next instruction address next to a received instruction address, and transmit, to the second processor, the calculated instruction address and instruction information read out on the basis of the calculated instruction address, transmit, to the first processor, a first instruction address that is an instruction address included in an execution result of executed processing, and execute processing based on the instruction information received from the first processor, when a second instruction address that is the instruction address received from the first processor is identical to the first instruction address, and read out instruction information on the basis of the first instruction address and execute processing based on the instruction information read out, when the second instruction address is not identical to the first instruction address.

7 Claims, 14 Drawing Sheets

FIG. 6A
FIG. 6B
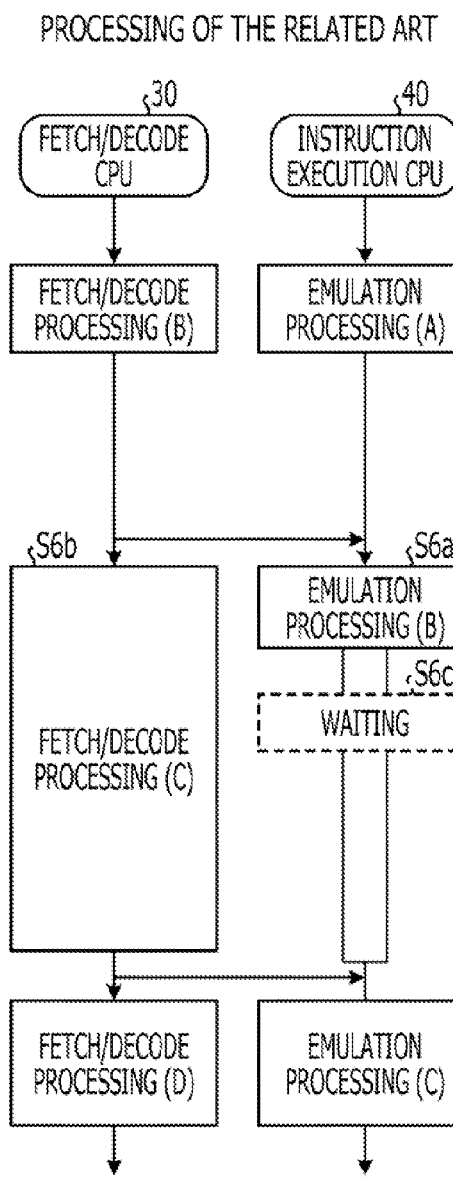
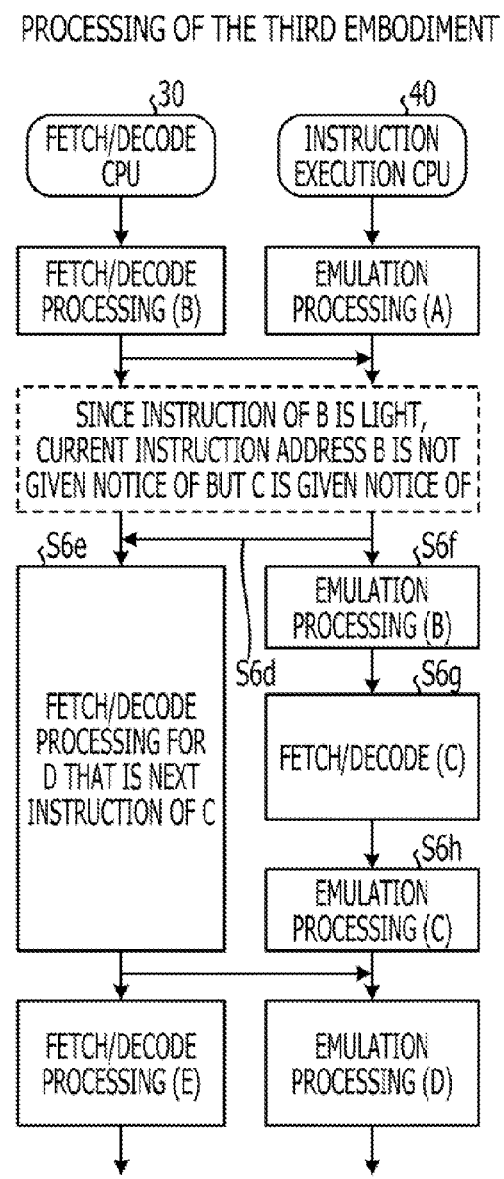

FIG. 9A
FIG. 9B
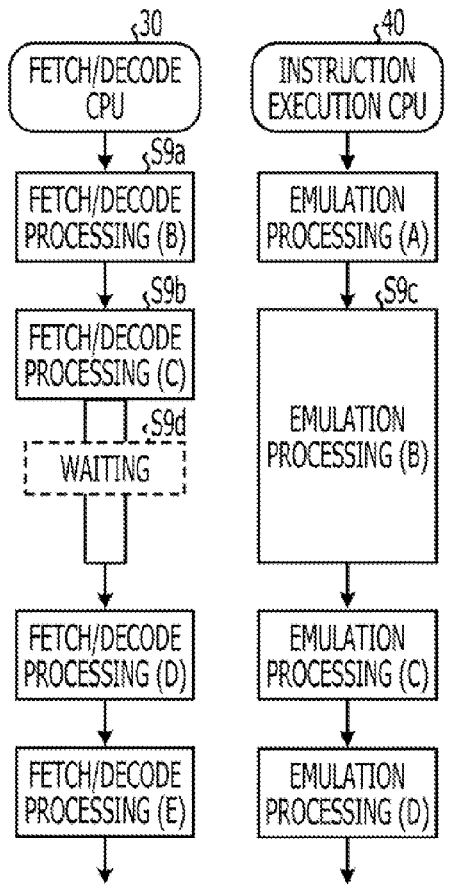
PROCESSING OF THE RELATED ART
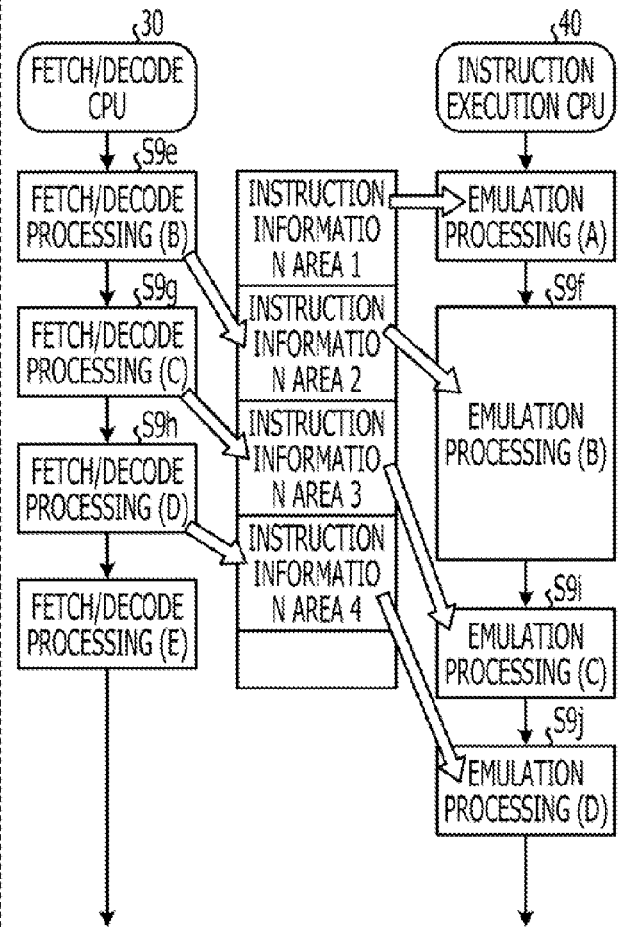
PROCESSING OF AN EXAMPLE OF A MODIFICATION TO THE THIRD EMBODIMENT

INFORMATION PROCESSING DEVICE AND EMULATION PROCESSING PROGRAM AND METHOD

CROSS-REFERENCE TO RELATED APPLICATIONS

This application is based upon and claims the benefit of priority of the prior Japanese Patent Application No.2010-230015, filed on Oct. 12, 2010, the entire contents of which are incorporated herein by reference.

FIELD

The present invention relates to an information processing device in which emulation processing is executed, an emulation processing program, and an emulation processing method.

BACKGROUND

In the past, there have been CPU emulators, each of which causes an own central processing unit (CPU) to execute the operation of an other CPU whose architecture is different from the architecture of the own CPU. With respect to software difficult to execute in the architecture of the own CPU, the CPU emulator causes the own CPU to execute the operation of a CPU in the architecture of which the software is operable, and hence the CPU emulator causes the software to be executed in the own CPU.

In addition, a technique has been known in which a first software module emulating instruction codes is implemented in a main processor and one of processor cores other than the main processor prefetches an instruction code to be executed by the main processor to a shared cache memory in advance of the execution of the main processor. In addition to this, for example, a technique has also been known in which an instruction emulation processing operation is divided in response to the number of processors, the individual divided processing operations are assigned to processors, respectively, and individual processors execute in parallel the assigned processing operations. Examples of such techniques are disclosed in Japanese Laid-open Patent Publication No. 2004-127154 and Japanese Laid-open Patent Publication No. 2006-268487.

SUMMARY

According to an aspect of the embodiment, an emulation processing method causing a computer including a first processor and a second processor to execute emulation processing, the emulation processing method includes: causing a computer to, calculate a next instruction address next to a received instruction address, and transmit, to the second processor, the calculated instruction address and instruction information read out on the basis of the calculated instruction address, transmit, to the first processor, a first instruction address that is an instruction address included in an execution result of executed processing, and execute processing based on the instruction information received from the first processor, when a second instruction address that is the instruction address received from the first processor is identical to the first instruction address, and read out instruction information on the basis of the first instruction address and execute processing based on the instruction information read out, when the second instruction address is not identical to the first instruction address.

The object and advantages of the embodiment will be realized and attained by at least the features, elements, and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIGS. 6A and 6B are explanatory diagrams comparing processing of the related art with processing of a third embodiment at the time of the occurrence of a wait time in an instruction execution CPU;

FIGS. 9A and 9B are explanatory diagrams comparing processing of the related art with processing of an example of a modification to the third embodiment at the time of the occurrence of a wait time in a fetch/decode CPU;

DESCRIPTION OF EMBODIMENTS

For example, in a technique of the related art in which a plurality of physical CPUs are caused to execute instruction emulation processing in a pipeline manner, when the instruction of an instruction word to be emulated is a branch instruction, it turns out that another physical CPU different from a physical CPU executing the branch instruction interrupts processing until the termination of the branch instruction.

In one aspect, an object of the embodiment is to substantially suppress the reduction of a processing speed due to processing that is to be emulated is a branch instruction.

Figure 14:
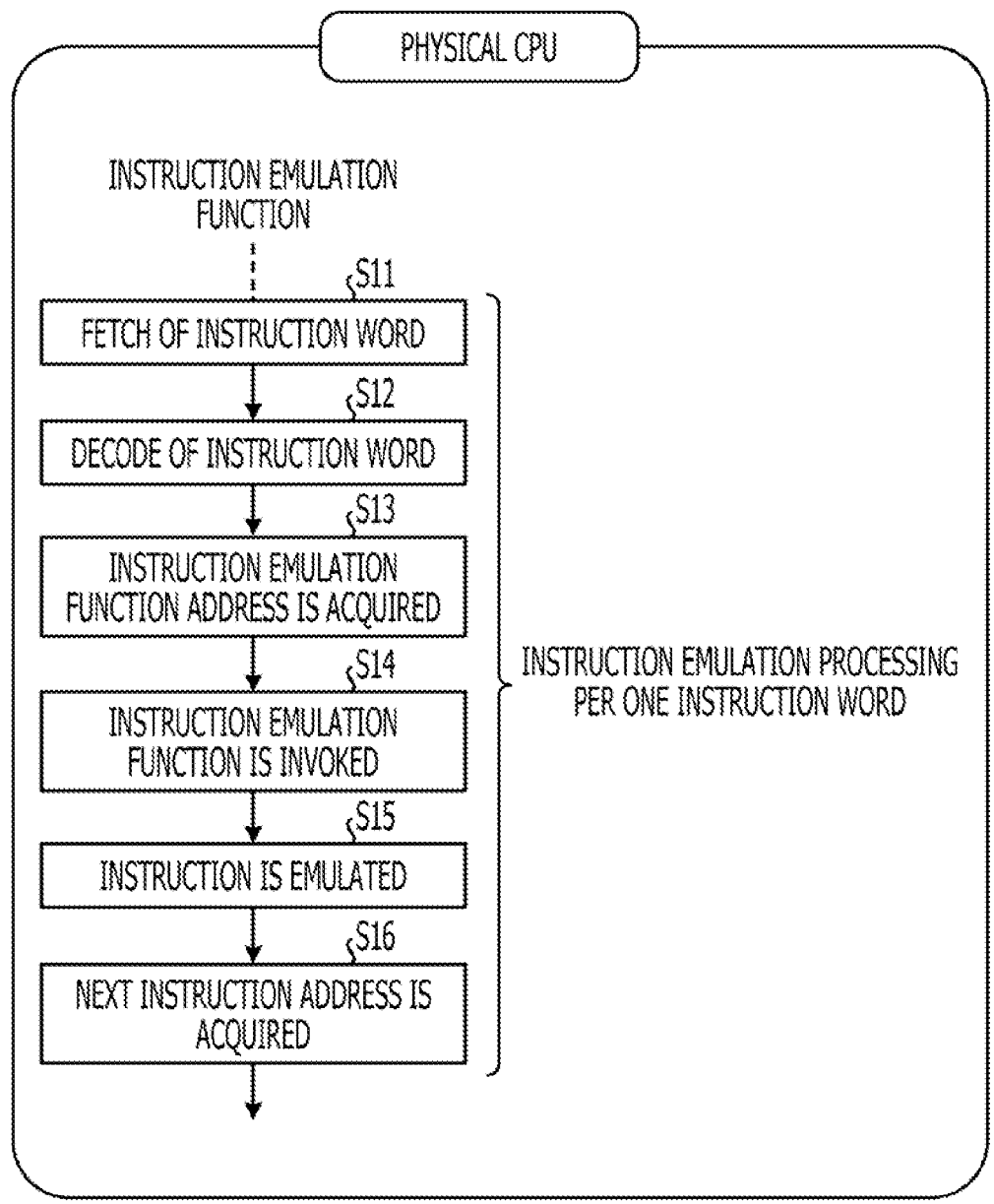
FIG. 14 is a sequence diagram of instruction emulation processing performed in one physical CPU.

First, instruction emulation processing per one instruction word, which is to be executed by one physical CPU, will be described with reference to FIG. 14. FIG. 14 is the sequence diagram of instruction emulation processing performed in one physical CPU. First, the physical CPU loads (fetches) an instruction word from an instruction address (Step S11), and analyzes (decodes) the fetched instruction word (Step S12).

Furthermore, the physical CPU acquires the address of an instruction emulation function corresponding to the instruction word, from the value of the fetched instruction word (Step S13). In addition, the physical CPU invokes the instruction emulation function indicated by the address acquired in S13 (Step S14). The physical CPU executes the instruction emulation function invoked in S14, using an operand obtained in S12 (Step S15), and acquires the instruction address of an instruction word to be executed next (Step S16). In this way, the instruction emulation processing sequentially emulates subsequent instruction words.

There is a case in which the restriction of the number of CPUs is imposed depending on software caused to operate using a CPU emulator. It may also be considered that an information processing device executing the software on which the restriction of the number of CPUs is imposed includes physical CPUs whose number is greater than or equal to the restriction imposed on the software. In that case, when one physical CPU included in the information processing device emulates one CPU, some redundant physical CPUs turn out to be left. Therefore, a mechanism is necessary in which one CPU is emulated at a faster rate using a plurality of physical CPUs.

Hereinafter, embodiments of an information processing device, an emulation processing program, and an emulation processing method, disclosed in the present application, will be described in detail on the basis of the drawings. In addition, while, in the embodiments described hereinafter, the information processing device will be described on the assumption that the information processing device includes two physical CPUs, two physical cores may also be included in one physical CPU. In addition, it should be understood that the invention is not limited owing to the present embodiments.

First Embodiment

Figure 1:
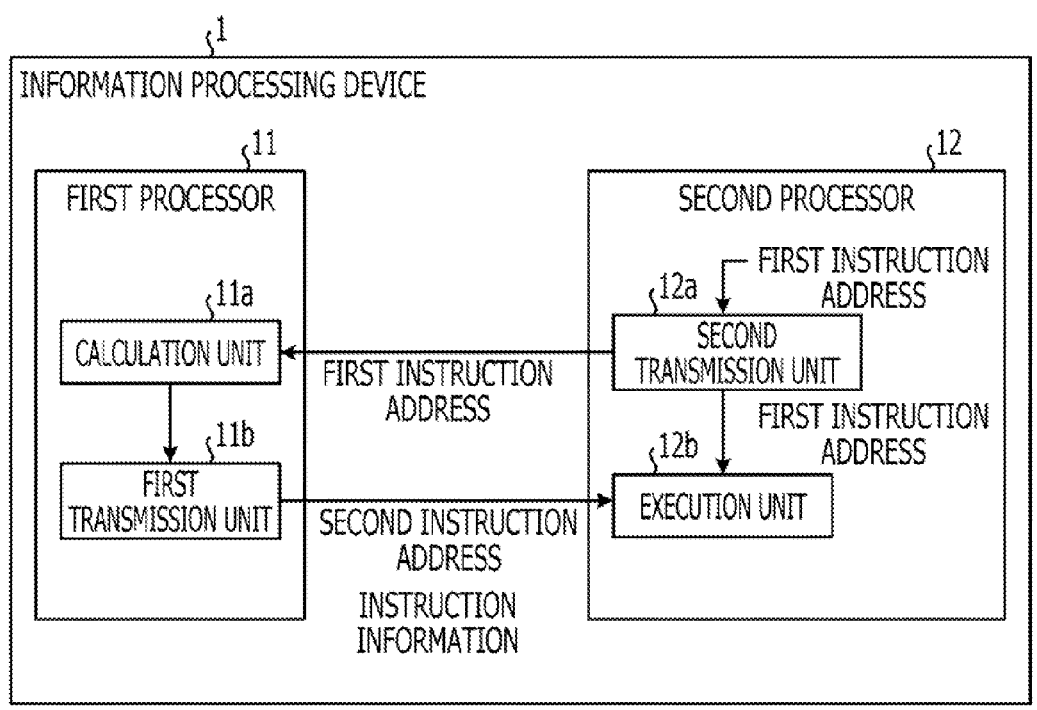
FIG. 1 is a functional block diagram illustrating a configuration of an information processing device according to a first embodiment.

FIG. 1 is a functional block diagram illustrating the configuration of an information processing device according to the first present embodiment. As illustrated in FIG. 1, an information processing device 1 includes a first processor 11 and a second processor 12. In addition, the first processor 11 includes a calculation unit 11a and a first transmission unit 11b. Furthermore, the second processor 12 includes a second transmission unit 12a and an execution unit 12b.

The calculation unit 11a calculates an instruction address next to an instruction address received from the second processor 12. In addition, the instruction address received from the second processor 12 indicates a first instruction address included in the execution result of instruction emulation processing that has been executed by the second processor 12.

The first transmission unit 11b transmits, to the second processor 12, an instruction address calculated by the calculation unit 11a and instruction information read out on the basis of the corresponding instruction address. Here, it is assumed that to read out instruction information on the basis of an instruction address is referred to as "to fetch".

The second transmission unit 12a transmits, to the first processor 11, the first instruction address that is the instruction address included in the execution result of the executed instruction emulation processing. When a second instruction address that is an instruction address received from the first processor 11 is identical to the first instruction address, the execution unit 12b executes emulation processing based on instruction information received from the first processor 11. In addition, when the second instruction address is not identical to the first instruction address, the execution unit 12b reads out instruction information on the basis of the first instruction address and executes instruction emulation processing based on the instruction information read out.

Figure 2:
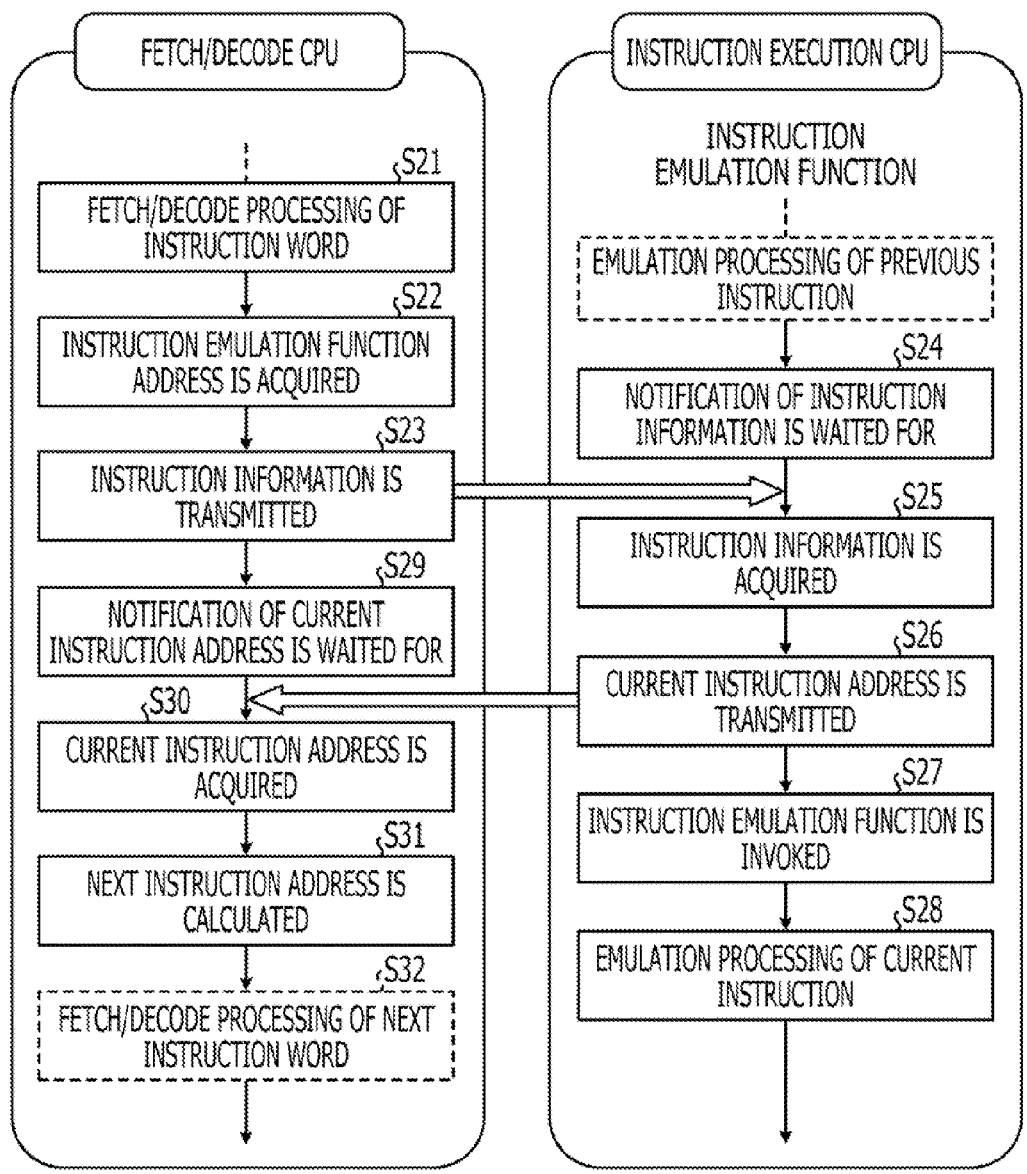
FIG. 2 is a sequence diagram of processing performed in the information processing device according to the first embodiment.

Next, the sequence of the instruction emulation processing performed in the information processing device 1 will be described with reference to FIG. 2. FIG. 2 is a sequence diagram of processing performed in the information processing device according to the first embodiment. In addition, in FIG. 2, the sequence of the instruction emulation processing of one instruction will be described. As illustrated in FIG. 2, it is assumed that the information processing device 1 includes a fetch/decode CPU, which is one physical CPU, and an instruction execution CPU that is one physical CPU different from the corresponding fetch/decode CPU.

First, the fetch/decode CPU fetches an instruction word from an instruction address of a CPU to be the target of emulation and decodes the fetched instruction word (Step S21). In addition, from the value of the fetched instruction word, the fetch/decode CPU acquires the address of an instruction emulation function corresponding to the instruction word (Step S22). In addition, the first transmission unit 11b in the fetch/decode CPU transmits, to the instruction execution CPU, instruction information including the instruction address (second instruction address) of the CPU to be the target of emulation (Step S23).

Next, the instruction execution CPU waits for the notification of the instruction information (Step S24). In the instruction execution CPU, when the instruction information is acquired (Step S25), the second transmission unit 12a transmits, to the fetch/decode CPU, an instruction address (first instruction address) included in the execution result of the emulation processing of a previous instruction (Step S26). In addition, the first instruction address indicates a current instruction address that is the instruction address of an instruction to be executed immediately afterwards. Subsequently, when the second instruction address is identical to the first instruction address, the execution unit 12b in the instruction execution CPU invokes an instruction emulation function using the acquired instruction information (Step S27). On the other hand, when the second instruction address is not identical to the first instruction address, the execution unit 12b in the instruction execution CPU fetches an instruction word from the first instruction address, and invokes an instruction emulation function using the fetched instruction information (Step S27). In addition, the execution unit 12b executes the invoked instruction emulation function using the instruction information (Step S28).

On the other hand, the fetch/decode CPU waits for the notification of the current instruction address (Step S29). When the fetch/decode CPU has acquired the first instruction address that is the current instruction address (Step S30), the calculation unit 11a calculates a next instruction address that is an instruction address next to the acquired current instruction address (Step S31). In addition, subsequently, the fetch/decode CPU fetches an instruction word from the next instruction address, and decodes the corresponding fetched instruction word (Step S32).

In such a way as described above, the information processing device 1 causes the instruction address (first instruction address) included in the execution result of emulation to be transmitted to the fetch/decode CPU. Therefore, since the fetch/decode CPU can execute the fetch and decode of an instruction subsequent to an instruction indicated by the received first instruction address in a pipeline manner along with the emulation of the instruction indicated by the corresponding instruction address, it is possible to speed up the entire emulation processing. In particular, even if the instruction indicated by the received first instruction address is a branch instruction, the fetch/decode CPU fetches and decodes the instruction subsequent to the corresponding instruction. Therefore, when branch fails in the emulation of the corresponding instruction, it is possible to utilize the decode result. Therefore, in the fetch/decode CPU, it is possible to speed up the entire emulation processing, and it is possible to substantially suppress the reduction of a processing speed due to the fact that the emulation processing is the branch instruction.

Second Embodiment

Configuration of Emulation Device According to Second Embodiment

Figure 3:
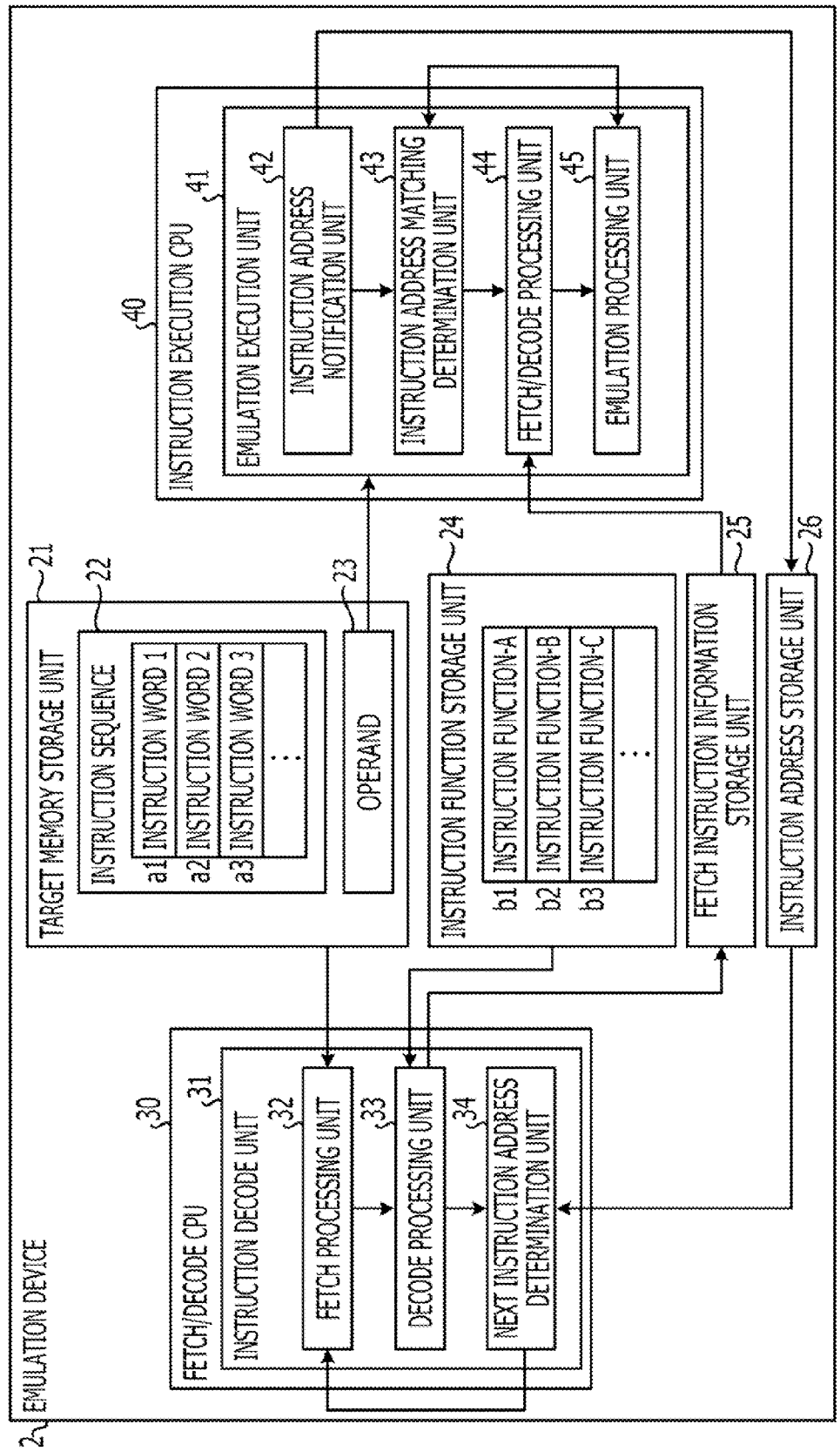
FIG. 3 is a functional block diagram illustrating a configuration of an emulation device according to a second embodiment.

FIG. 3 is a functional block diagram illustrating the configuration of an emulation device 2 according to the second present embodiment. As illustrated in FIG. 3, the emulation device 2 includes two physical CPUs such as a fetch/decode CPU 30 and an instruction execution CPU 40. In addition, the emulation device 2 includes a target memory storage unit 21, an instruction function storage unit 24, a fetch instruction information storage unit 25, and an instruction address storage unit 26.

The fetch/decode CPU 30 includes an instruction decode unit 31 that fetches an instruction of a CPU to be the target of emulation and decodes the fetched instruction. Furthermore, the instruction decode unit 31 includes a fetch processing unit 32, a decode processing unit 33, and a next instruction address determination unit 34. The instruction execution CPU 40 includes an emulation execution unit 41 that executes emulation on the basis of the information of an instruction decoded by the fetch/decode CPU 30. Furthermore, the emulation execution unit 41 includes an instruction address notification unit 42, an instruction address matching determination unit 43, a fetch/decode processing unit 44, and an emulation processing unit 45. In addition, while the fetch/decode CPU 30 and the instruction execution CPU 40 are CPUs, each of the fetch/decode CPU 30 and the instruction execution CPU 40 may be an electronic circuit as an application specific integrated circuit (ASIC), a field programmable gate array (FPGA), a micro processing unit (MPU), or the like.

The target memory storage unit 21 is assigned as the memory space of the CPU to be the target of emulation, and stores therein an instruction sequence 22 and an operand 23. The instruction sequence 22 is a sequence of instruction words of the CPU to be the target of emulation. The operand 23 is information indicated by an operand field included in an instruction word, and indicates data to be the target of instruction. In addition, for example, the target memory storage unit 21 may be a semiconductor memory device such as a random access memory (RAM), a flash memory, or the like, or a storage device such as a hard disk, an optical disk, or the like.

The instruction function storage unit 24 stores therein a function emulating the operation of an instruction of the CPU to be the target of emulation. Hereinafter, it is assumed that a function stored in the instruction function storage unit 24 is called an instruction emulation function. The fetch instruction information storage unit 25 stores therein information relating to an instruction, shared by the fetch/decode CPU 30 and the instruction execution CPU 40.

Figure 4:
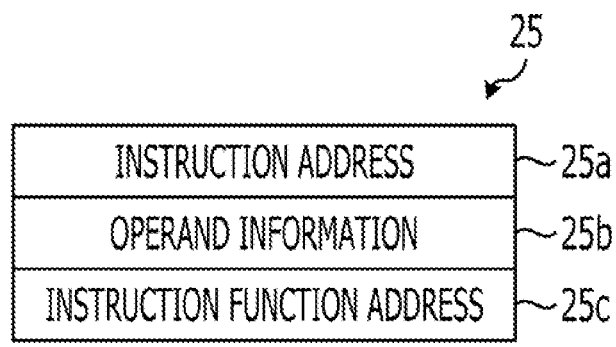
FIG. 4 is a diagram illustrating an example of a data structure of a fetch instruction information storage unit.

Here, the fetch instruction information storage unit 25 will be described with reference to FIG. 4. FIG. 4 is a diagram illustrating an example of the data structure of the fetch instruction information storage unit 25. As illustrated in FIG. 4, the fetch instruction information storage unit 25 stores therein an instruction address 25a, operand information 25b, and an instruction function address 25c with associating the instruction address 25a, the operand information 25b, and the instruction function address 25c with one another. The instruction address 25a indicates the address of an instruction word fetched from the instruction sequence 22. The operand information 25b is operand information relating to the instruction word fetched from the instruction sequence 22, and indicates the address of data to be the target of an instruction, for example. The instruction function address 25c indicates the storage location address of an instruction emulation function corresponding to the instruction word fetched from the instruction sequence 22.

The instruction address storage unit 26 stores therein information relating to an instruction to be emulated by the instruction execution CPU 40 immediately afterwards. Namely, the instruction address storage unit 26 stores therein a current instruction address that is the instruction address of an instruction to be emulated immediately afterwards, in the instruction sequence 22. In addition, for example, the instruction function storage unit 24, the fetch instruction information storage unit 25, and the instruction address storage unit 26 are semiconductor memory devices such as random access memories (RAMs), flash memories, or the like, or storage devices such as hard disks, optical disks, or the like.

In accordance with a program counter, the fetch processing unit 32 fetches an instruction word indicated by an instruction address, from the instruction sequence 22. The decode processing unit 33 decodes the fetched instruction word, and notifies the instruction execution CPU 40 of instruction information necessary for instruction execution. Specifically, the decode processing unit 33 resolves the instruction word fetched by the fetch processing unit 32 into individual fields, thereby obtaining operand information. In addition, on the basis of the instruction function storage unit 24, the decode processing unit 33 acquires the address of an instruction emulation function corresponding to the instruction of the instruction word. In addition, the decode processing unit 33 stores, in the fetch instruction information storage unit 25, instruction information including the instruction address of the instruction word fetched from the instruction sequence 22, and the operand information and the address of the instruction emulation function, obtained as the result of decode.

The next instruction address determination unit 34 determines whether or not the instruction address of the decoded instruction matches an instruction address obtained from the execution result of the emulation of a previous instruction. Namely, the next instruction address determination unit 34 determines whether or not the instruction address of the target of fetch and decode processing matches an effective address obtained from the execution result of the previous instruction subjected to emulation for the same time period as the fetch and decode processing. This effective address is an instruction address to be processed subsequent to the previous instruction subjected to the emulation processing.

Specifically, the next instruction address determination unit 34 acquires the instruction information stored in the fetch instruction information storage unit 25, from the decode processing unit 33. In addition, the next instruction address determination unit 34 reads out, from the instruction address storage unit 26, the current instruction address of an instruction to be emulated immediately afterwards. In addition, the next instruction address determination unit 34 determines whether or not the instruction address 25a included in the instruction information matches the current instruction address. In addition, when the instruction address 25a matches the current instruction address, the next instruction address determination unit 34 calculates the instruction address of an instruction subsequent to an instruction indicated by the address of the instruction address 25a and holds the calculated instruction address in the program counter.

In addition, when the instruction address 25a does not match the current instruction address, the next instruction address determination unit 34 determines that the effective address obtained from the execution result of the emulation of the previous instruction has been changed owing to a predetermined condition. In addition, the next instruction address determination unit 34 holds the instruction address of an instruction subsequent to an instruction indicated by the current instruction address, in the program counter. In addition, for example, the predetermined condition corresponds to a case or the like in which the previous instruction whose execution result corresponds to the current instruction address is a branch instruction, or a case or the like in which an interrupt processing occurs, and in those cases, the effective address is changed.

The instruction address notification unit 42 notifies the instruction decode unit 31 of the current instruction address obtained from the execution result of the emulation processing of an instruction. Specifically, the instruction address notification unit 42 acquires the effective address obtained from the execution result of the emulation of the previous instruction by the emulation processing unit 45 described later, namely, the current instruction address that is the instruction address of an instruction to be executed immediately afterwards. In addition, the instruction address notification unit 42 stores the acquired current instruction address in the instruction address storage unit 26.

The instruction address matching determination unit 43 determines whether or not an instruction address obtained from the execution result of the emulation processing of the previous instruction matches the instruction address of a decoded instruction. Specifically, the instruction address matching determination unit 43 acquires the current instruction address given notice of by the instruction address notification unit 42. In addition, the instruction address matching determination unit 43 reads out instruction information from the fetch instruction information storage unit 25. In addition, the instruction address matching determination unit 43 determines whether or not the current instruction address matches the instruction address 25a included in the instruction information. In addition, when the current instruction address matches the instruction address 25a, the instruction address matching determination unit 43 requests the emulation processing unit 45 to execute emulation processing utilizing the instruction information. On the other hand, when the current instruction address does not match the instruction address 25a, the instruction address matching determination unit 43 discards the instruction information stored in the fetch instruction information storage unit 25. In addition, the instruction address matching determination unit 43 requests the fetch/decode processing unit 44 to execute the fetch and decode processing of an instruction indicated by the current instruction address.

When having acquired the execution request for the fetch and decode processing from the instruction address matching determination unit 43, the fetch/decode processing unit 44 fetches an instruction word indicated by the current instruction address, from the instruction sequence 22. In addition, the fetch/decode processing unit 44 resolves the fetched instruction word into individual fields, thereby obtaining operand information. In addition, on the basis of the instruction function storage unit 24, the fetch/decode processing unit 44 acquires the address of an instruction emulation function corresponding to the instruction of the instruction word. In addition, the fetch/decode processing unit 44 notifies the emulation processing unit 45 of instruction information including the instruction address of the fetched instruction word, and the operand information and the address of the instruction emulation function, obtained as the result of decode.

The emulation processing unit 45 executes emulation processing on the basis of the instruction information. Specifically, the emulation processing unit 45 acquires instruction information from the instruction address matching determination unit 43 or the fetch/decode processing unit 44. In addition, the emulation processing unit 45 invokes an instruction emulation function indicated by the address of the instruction function address 25c included in the instruction information. In addition, the emulation processing unit 45 executes the emulation processing of an instruction indicated by the instruction function address 25c included in the instruction information. The emulation processing is executed by the instruction emulation function using the operand information 25b included in the instruction information.

Sequence of Instruction Emulation Processing According to Second Embodiment

Figure 5:
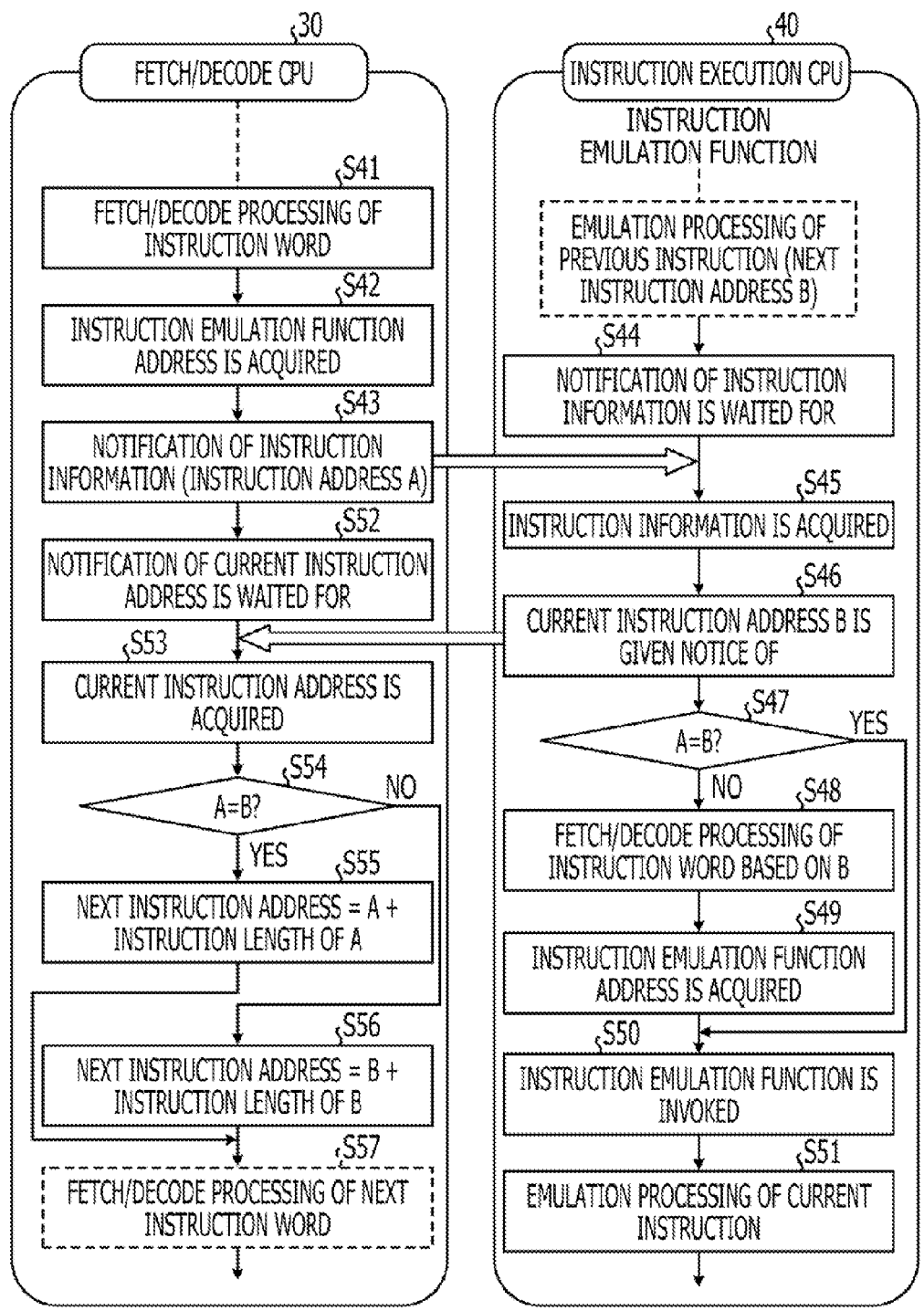
FIG. 5 is a sequence diagram of processing performed in the emulation device according to the second embodiment.

Next, the sequence of the instruction emulation processing of the emulation device 2 will be described with reference to FIG. 5. FIG. 5 is the sequence diagram of the emulation device according to the second embodiment. In addition, in FIG. 5, the sequence of one instruction emulation processing operation will be described. As illustrated in FIG. 5, it is assumed that the emulation device 2 includes the fetch/decode CPU 30 and the instruction execution CPU 40.

First, the fetch processing unit 32 fetches an instruction word indicated by an instruction address, from the instruction sequence 22, and the decode processing unit 33 decodes the fetched instruction word (Step S41). Here, it is assumed that the instruction address of the instruction fetched by the fetch processing unit 32 is expressed as an "instruction address A". In addition, on the basis of the instruction function storage unit 24, the decode processing unit 33 acquires the address of an instruction emulation function corresponding to the instruction of the instruction word (Step S42). In addition, through the fetch instruction information storage unit 25, the decode processing unit 33 notifies the instruction execution CPU 40 of instruction information including the instruction address A of the fetched instruction word, and the operand information and the address of the instruction emulation function, obtained as the result of decode (Step S43).

Next, the instruction execution CPU 40 waits for the notification of the instruction information (Step S44), and acquires the instruction information (Step S45). In addition, the instruction address notification unit 42 notifies the fetch/decode CPU 30 of a current instruction address obtained from the execution result of the emulation processing of a previous instruction (Step S46). Specifically, the instruction address notification unit 42 stores, in the instruction address storage unit 26, an effective address obtained from the execution result of the emulation processing of the previous instruction, namely, the current instruction address that is the instruction address of the current instruction to be executed immediately afterwards. Here, it is assumed that the current instruction address is expressed as an "instruction address B".

Subsequently, the instruction address matching determination unit 43 determines whether or not the instruction address B obtained from the execution result of the emulation processing of the previous instruction matches the instruction address A of a decoded instruction (Step S47). In addition, when the instruction address B matches the instruction address A (Step S47: Yes), the instruction address matching determination unit 43 determines that the instruction of the instruction address B has been already fetched, and shifts to Step S50 so as to cause the emulation processing to be executed.

When the instruction address B does not match the instruction address A (Step S47: No), the instruction address matching determination unit 43 determines that the previous instruction is a branch instruction or the like, and shifts to Step S48 so as to cause the fetch and decode processing of the instruction address B to be executed. In addition, the fetch/decode processing unit 44 fetches an instruction word indicated by the instruction address B, from the instruction sequence 22, and decodes the fetched instruction word (Step S48). In addition, on the basis of the instruction function storage unit 24, the fetch/decode processing unit 44 acquires the address of an instruction emulation function corresponding to the instruction of the instruction word (Step S49).

Subsequently, the emulation processing unit 45 invokes an instruction emulation function indicated by the address of the instruction function address 25c included in the instruction information (Step S50). In addition, the emulation processing unit 45 executes the emulation processing of the current instruction indicated by the instruction address B of the instruction address 25a included in the instruction information, namely, by the current instruction address (Step S51).

On the other hand, in the fetch/decode CPU 30, the next instruction address determination unit 34 waits for the notification of the current instruction address obtained from the execution result of the emulation of the previous instruction (Step S52). In addition, when the next instruction address determination unit 34 has acquired the instruction address B that is the current instruction address (Step S53), it is determined whether or not the instruction address A of an decoded instruction matches the instruction address B (Step S54).

When it has been determined that the instruction address A matches the instruction address B (Step S54: Yes), the next instruction address determination unit 34 calculates a next instruction address by adding the instruction length of an instruction indicated by the instruction address A to the corresponding instruction address A (Step S55). Specifically, on the basis of instruction information stored in the fetch instruction information storage unit 25, the next instruction address determination unit 34 calculates the next instruction address by adding the instruction length of an instruction indicated by the instruction address A to the corresponding instruction address A.

When it has been determined that the instruction address A does not match the instruction address B (Step S54: No), the next instruction address determination unit 34 determines that the instruction of the instruction address B has not been fetched. In addition, the next instruction address determination unit 34 calculates a next instruction address by adding the instruction length of an instruction indicated by the instruction address B to the corresponding instruction address B (Step S56). Specifically, the next instruction address determination unit 34 fetches an instruction word indicated by the instruction address B from the instruction sequence 22, and obtains the instruction length of the instruction word. In addition, the next instruction address determination unit 34 calculates a next instruction address obtained by adding the obtained instruction length to the instruction address B.

In addition, the next instruction address determination unit 34 holds the calculated next instruction address in the program counter, and the fetch processing unit 32 and the decode processing unit 33 execute fetch processing and decode processing, which relate to the next instruction address (Step S57).

Advantageous Effect of Second Embodiment

According to the second embodiment, the next instruction address determination unit 34 in the instruction decode unit 31 determines whether or not the instruction address of a decoded instruction matches the current instruction address given notice of by the instruction address notification unit 45. In addition, when the instruction address of the decoded instruction does not match the current instruction address, the next instruction address determination unit 34 calculates the instruction address of an instruction subsequent to an instruction indicated by the current instruction address.

According to such a configuration, when the instruction address of the decoded instruction does not match the current instruction address, it is determined that the previous instruction whose execution result corresponds to the current instruction address is a branch instruction or the like, and the instruction address of an instruction subsequent to an instruction indicated by the current instruction address is calculated. As a result, in the emulation execution unit 41, the emulation processing of the current instruction relating to the current instruction address is executed. On the other hand, in the instruction decode unit 31, it is possible to cause fetch processing and decode processing, related to the calculated instruction address (instruction address indicating an instruction subsequent to the current instruction), to be executed. Therefore, it is possible to speed up the entire emulation processing.

In addition, even if the current instruction relating to the current instruction address is a branch instruction, the next instruction address determination unit 34 calculates the instruction address of an instruction subsequent to an instruction indicated by the current instruction. Therefore, in the next instruction address determination unit 34, the fetch processing and the decode processing, related to the calculated instruction address, are executed. Therefore, when branch fails in the emulation of the current instruction, the decode result is utilized, and hence it is possible to speed up the entire emulation processing. Namely, it is possible to substantially suppress the reduction of a processing speed due to the fact that the emulation processing is the branch instruction. In addition, the failure of branch indicates a case in which, while the emulation of the branch instruction is executed, branch fails.

Third Embodiment

Incidentally, in the emulation device 2 of the second embodiment, a case has been described in which, while the current instruction address obtained from the emulation result of the previous instruction does not matches an instruction address subsequent to the previous instruction owing to a branch instruction or the like, it is possible to execute the instruction emulation processing at a fast rate. However, when the processing amount of the emulation processing itself is light, a wait time occurs in the instruction execution CPU executing the emulation processing, and it is difficult to execute the instruction emulation processing at a fast rate. Therefore, in a third embodiment, a case will be described in which, even if the processing amount of the emulation processing itself is light, it is possible to execute the instruction emulation processing at a fast rate. Here, the processing of the related art is compared with the processing of the third embodiment at the time of the occurrence of a wait time in the instruction execution, with reference to FIGS. 6A and 6B.

FIGS. 6A and 6B are explanatory diagrams comparing the processing of the related art with the processing of the third embodiment at the time of the occurrence of a wait time in the instruction execution CPU. FIG. 6A is the sequence diagram of the processing of the related art, and FIG. 6B is the sequence diagram of the processing of the third embodiment. In addition, it is assumed that alphabets in parentheses indicate instruction addresses. In addition, it is assumed that the instruction of the instruction address B is an instruction where the processing amount of the emulation processing itself is light.

As illustrated in FIG. 6A, in the processing of the related art, the instruction execution CPU 40 executes the emulation processing of the instruction of the instruction address B (Step S6a). At this time, the fetch/decode CPU 30 fetches and decodes the instruction of an instruction address C subsequent to the instruction of the instruction address B (Step S6b). At this time, since the emulation processing of the instruction of the instruction address B is light, the emulation processing of the instruction of the instruction address B finishes at the early time of fetch/decode processing relating to the instruction address C. In addition, the instruction execution CPU 40 waits until the fetch/decode processing of the instruction of the instruction address C in the fetch/decode CPU 30 finishes (Step S6c). Accordingly, when there is an instruction where the processing of the emulation processing itself is light, a long wait time occurs in the instruction execution CPU 40. Therefore, it is difficult for the emulation device 2 to execute the instruction emulation processing at a fast rate.

On the other hand, as illustrated in FIG. 6B, the instruction execution CPU 40 notifies the fetch/decode CPU 30 of the instruction address C of an instruction subsequent to a light instruction indicated by the instruction address B (Step S6d). In addition, the fetch/decode CPU 30 fetches and decodes the instruction of an instruction address D subsequent to an instruction indicated by the instruction address C given notice of by the instruction execution CPU 40 (Step S6e). At this time, in the instruction execution CPU 40, the emulation processing of an instruction indicated by the instruction address B is executed (Step S6f). In addition, subsequently, the fetch/decode processing of an instruction indicated by the instruction address C subsequent to the instruction address B is executed (Step S6g), and the emulation processing of the corresponding instruction is executed (Step S6h). Accordingly, even if there is an instruction where the processing of the emulation processing itself is light, emulation processing also including an instruction subsequent to the light instruction is collectively executed. Therefore, it is possible for the emulation device 2 to execute the instruction emulation processing at a fast rate.

Therefore, in the third embodiment, a case will be described in which, even if there is an instruction where the processing amount of the emulation processing itself is light, it is possible for the emulation device 2 to execute the instruction emulation processing at a fast rate.

Configuration of Emulation Device According to Third Embodiment

Figure 7:
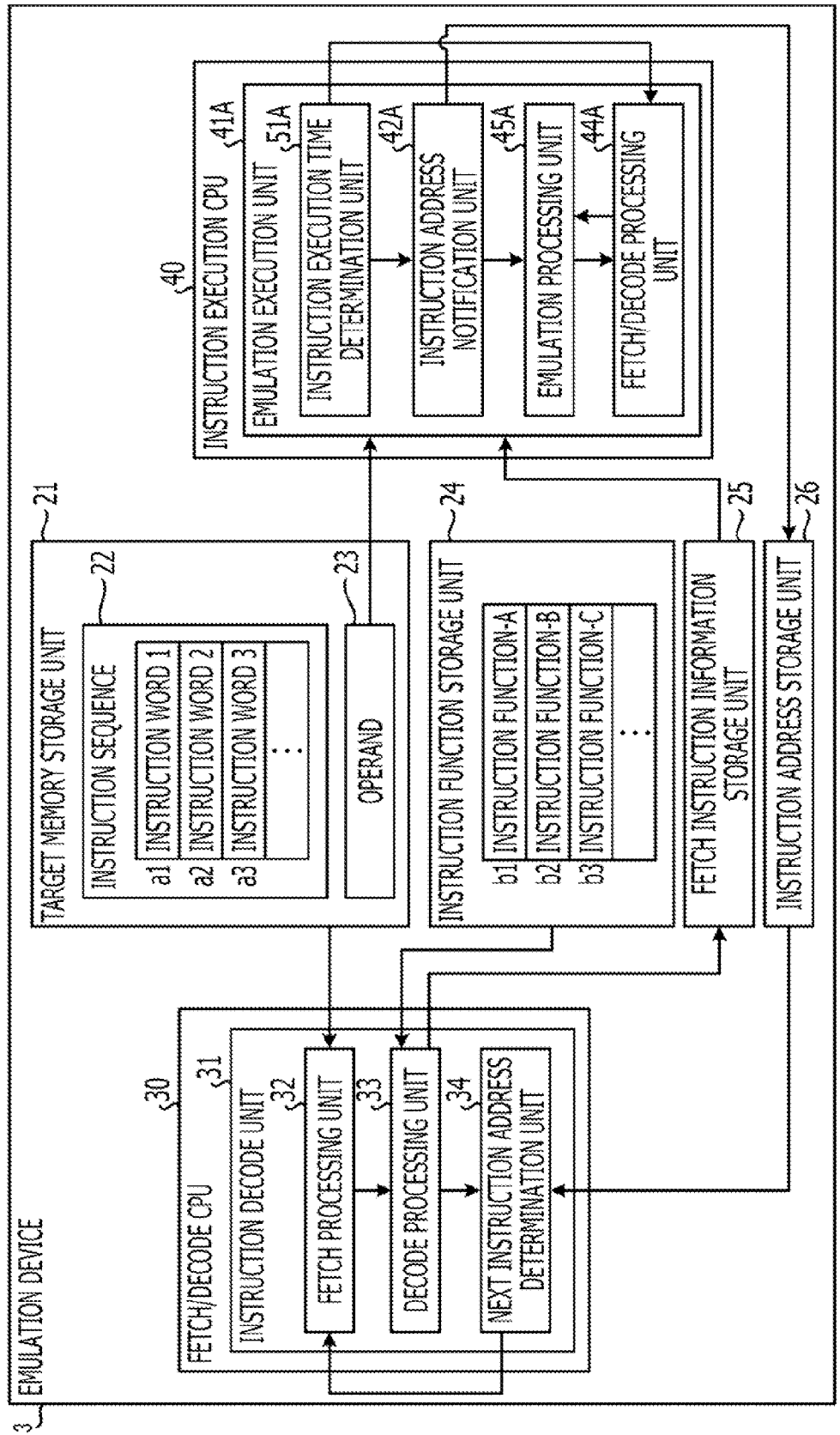
FIG. 7 is a functional block diagram illustrating a configuration of an emulation device according to the third embodiment.

FIG. 7 is a functional block diagram illustrating the configuration of an emulation device according to the third embodiment. In addition, a same symbol is assigned to substantially the same configuration as the emulation device illustrated in FIG. 3, and hence the redundant configuration and the redundant description of an operation thereof will be omitted. The third embodiment differs from the second embodiment in that the instruction address matching determination unit 43 in the emulation execution unit 41A is removed and an instruction execution time determination unit 51A is added. Furthermore, the third embodiment differs from the second embodiment in that the fetch/decode processing unit 44A, the emulation processing unit 45A, and the instruction address notification unit 42A in the emulation execution unit 41A are changed.

The instruction execution time determination unit 51A determines whether or not an emulation execution time taken from the start of the emulation of a decoded instruction to the termination of the emulation of a subsequent instruction is approximate to a decode execution time taken for the fetch and decode processing of an instruction. Specifically, the instruction execution time determination unit 51A reads out instruction information from the fetch instruction information storage unit 25. In addition, the instruction execution time determination unit 51A determines whether or not an instruction relating to the instruction information and an instruction subsequent to the instruction are light instructions, on the basis of the types of the instructions. In addition, the instruction execution time determination unit 51A notifies the instruction address notification unit 42A and the fetch/decode processing unit 44A of the determination result.

For example, an average execution time taken for the fetch and decode processing of one instruction and the average execution times of individual instructions are preliminarily stored in a memory unit (not illustrated). In addition, the instruction execution time determination unit 51A individually reads out the average execution time of an instruction relating to the instruction information and the average execution time of an instruction subsequent to the instruction from the memory unit. In addition, the instruction execution time determination unit 51A reads out an average execution time taken for the fetch and decode processing of an instruction from the memory unit. In addition, the instruction execution time determination unit 51A determines whether or not a value is approximate to the average execution time taken for the fetch and decode processing of the instruction, the value being obtained by adding the average execution time of the instruction relating to the instruction information to the average execution time of an instruction subsequent to the instruction.

On the basis of a determination result determined by the instruction execution time determination unit 51A, the instruction address notification unit 42A notifies the instruction decode unit 31 of an instruction address. Specifically, when, as the determination result based on the instruction execution time determination unit 51A, the emulation execution time is approximate to the decode execution time, the instruction address notification unit 42A stores, in the instruction address storage unit 26, the instruction address of an instruction subsequent to a decoded instruction. On the other hand, when, as the determination result based on the instruction execution time determination unit 51A, the emulation execution time is not approximate to the decode execution time, the instruction address notification unit 42A stores, in the instruction address storage unit 26, an instruction address indicated by the decoded instruction.

The emulation processing unit 45A executes the emulation processing on the basis of the instruction information. Specifically, after the notification of the instruction address by the instruction address notification unit 42A, the emulation processing unit 45A acquires the instruction information read out by the instruction execution time determination unit 51A. In addition, after the fetch/decode processing unit 44A has performed processing, the emulation processing unit 45A acquires instruction information created by the fetch/decode processing unit 44A. In addition, the emulation processing unit 45A invokes an instruction emulation function indicated by the address of the instruction function address 25c included in the acquired instruction information. In addition, the emulation processing unit 45A executes the emulation processing of an instruction indicated by the instruction address 25a included in the instruction information.

On the basis of a determination result determined by the instruction execution time determination unit 51A, the fetch/decode processing unit 44A fetches the instruction of an instruction address subsequent to a decoded instruction from the instruction sequence 22. Specifically, when, as the determination result based on the instruction execution time determination unit 51A, the emulation execution time is approximate to the decode execution time, the fetch/decode processing unit 44A fetches the instruction subsequent to the decoded instruction from the instruction sequence 22. In addition, the fetch/decode processing unit 44A resolves the fetched instruction word into individual fields, thereby obtaining operand information. In addition, on the basis of the instruction function storage unit 24, the fetch/decode processing unit 44A acquires the address of an instruction emulation function corresponding to the instruction of the instruction word. In addition, the fetch/decode processing unit 44A creates instruction information including the instruction address of the fetched instruction word, and the operand information and the address of the instruction emulation function, obtained as the result of decode, and notifies the emulation processing unit 45A of the created instruction information. On the other hand, when, as the determination result based on the instruction execution time determination unit 51A, the emulation execution time is not approximate to the decode execution time, it is assumed that the fetch/decode processing unit 44A does not execute the fetch and decode processing.

Sequence of Instruction Emulation Processing According to Third Embodiment

Figure 8:
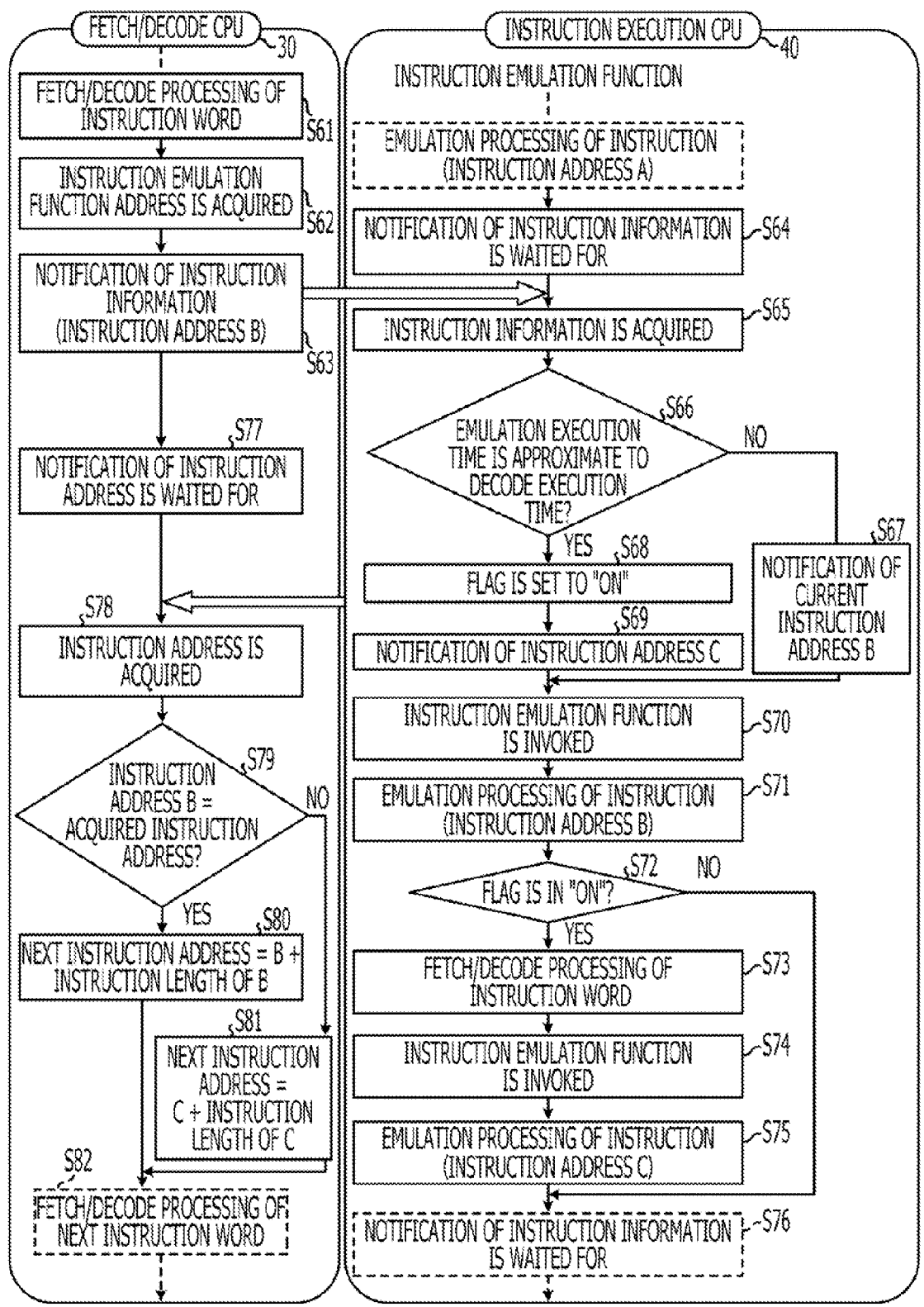
FIG. 8 is a sequence diagram of processing performed in the emulation device according to the third embodiment.

Next, the sequence of the instruction emulation processing of an emulation device 3 will be described with reference to FIG. 8. FIG. 8 is the sequence diagram of processing performed in the emulation device according to the third embodiment. In addition, in FIG. 8, the sequence of one instruction emulation processing operation will be described. As illustrated in FIG. 8, it is assumed that the emulation device 3 includes the fetch/decode CPU 30 and the instruction execution CPU 40.

First, the fetch processing unit 32 fetches an instruction word indicated by an instruction address from the instruction sequence 22, in accordance with the program counter, and the decode processing unit 33 decodes the fetched instruction word (Step S61). Here, it is assumed that the instruction address of the instruction fetched by the fetch processing unit 32 is expressed as an "instruction address B". In addition, on the basis of the instruction function storage unit 24, the decode processing unit 33 acquires the address of an instruction emulation function corresponding to the instruction of this instruction word (Step S62). In addition, through the fetch instruction information storage unit 25, the decode processing unit 33 notifies the instruction execution CPU 40 of instruction information including the instruction address B of the fetched instruction word, and operand information and an instruction emulation function address, obtained as the result of decode (Step S63).

Next, in the instruction execution CPU 40, the instruction execution time determination unit 51A waits for the notification of the instruction information (Step S64), and acquires the instruction information (Step S65). In addition, the instruction execution time determination unit 51A determines whether or not an emulation execution time taken from the start of the instruction relating to the acquired instruction information to the termination of a subsequent instruction is approximate to a decode execution time taken for the fetch and decode processing (Step S66). Here, it is assumed that the instruction address of an instruction subsequent to an instruction indicated by the instruction address B included in the instruction information is expressed as an "instruction address C". For example, the instruction execution time determination unit 51A preliminarily stores the average execution times of individual instructions in a memory unit (not illustrated), and individually reads out the average execution time of an instruction relating to the instruction information and the average execution time of an instruction subsequent to the instruction from the memory unit. In addition, the instruction execution time determination unit 51A preliminarily stores an average execution time taken for the fetch and decode processing of one instruction in a memory unit (not illustrated), and reads out the average execution time taken for the fetch and decode processing of one instruction from the memory unit. In addition, the instruction execution time determination unit 51A determines whether or not a value is approximate to the average execution time taken for the fetch and decode processing of one instruction, the value being obtained by adding the average execution time of the instruction relating to the instruction information to the average execution time of the instruction subsequent to the instruction.

In addition, when the emulation execution time is not approximate to the decode execution time (Step S66: No), the instruction address notification unit 42A notifies the instruction decode unit 11 of the current instruction address B included in the instruction information, through the instruction address storage unit 26 (Step S67). On the other hand, when the emulation execution time is approximate to the decode execution time (Step S66: Yes), the instruction execution time determination unit 51A sets a flag to "ON" so that the fetch and decode processing of the instruction subsequent to the instruction relating to the instruction information (Step S68). In addition, through the instruction address storage unit 26, the instruction address notification unit 42A notifies the instruction decode unit 11 of the instruction address C of the instruction subsequent to the instruction relating to the instruction information (Step S69).

Subsequently, the emulation processing unit 45A invokes an instruction emulation function indicated by the address of the instruction function address 25c included in the instruction information (Step S70). In addition, the emulation processing unit 45A executes the emulation processing of an instruction indicated by the instruction address B of the instruction address 25a included in the instruction information (Step S71).

Next, the fetch/decode processing unit 44A determines whether or not the flag set by the instruction execution time determination unit 51A is in "ON" (Step S72). In addition, when it has been determined that the flag is not in "ON" (Step S72: No), the fetch/decode processing unit 44A shifts to Step S76 without executing the fetch and decode processing.

On the other hand, when it has been determined that the flag is in "ON" (Step S72: Yes), the fetch/decode processing unit 44A fetches the instruction word of the instruction address C subsequent to the instruction relating to the instruction information, and decodes the fetched instruction word (Step S73).

Subsequently, the emulation processing unit 45A invokes an instruction emulation function indicated by the instruction address C (Step S74). In addition, the emulation processing unit 45A executes the emulation processing of an instruction indicated by the instruction address C (Step S75). After that, the instruction execution time determination unit 51A waits for the notification of the instruction information from the fetch/decode CPU 30 (Step S76).

On the other hand, in the fetch/decode CPU 30, the next instruction address determination unit 34 waits for the notification of an instruction address from the instruction execution CPU 40 (Step S77). In addition, when the next instruction address determination unit 34 has acquired the instruction address from the instruction execution CPU 40 (Step S78), it is determined whether or not the instruction address B of the decoded instruction matches the instruction address acquired from the instruction execution CPU 40 (Step S79). In addition, here, when the instruction address B does not match the instruction address acquired from the instruction execution CPU 40, it is assumed that the next instruction address determination unit 34 acquires the instruction address C indicating the instruction subsequent to the instruction indicated by the instruction address B.

When the instruction address B matches the acquired instruction address (Step S79: Yes), the next instruction address determination unit 34 adds, to the instruction address B, the instruction length of the instruction indicated by the corresponding instruction address B on the basis of the instruction information, and calculates an next instruction address (Step S80).

On the other hand, when the instruction address B does not match the acquired instruction address (Step S79: No), the next instruction address determination unit 34 adds, to the acquired instruction address C, the instruction length of the instruction indicated by the corresponding instruction address C, and calculates the next instruction address (Step S81). Specifically, since having no instruction information relating to the instruction address C, the next instruction address determination unit 34 fetches an instruction word indicated by the instruction address C from the instruction sequence 22, and obtains the instruction length of this instruction word. In addition, the next instruction address determination unit 34 calculates the next instruction address obtained by adding the obtained instruction length to the instruction address C.

In addition, the next instruction address determination unit 34 holds the calculated next instruction address in the program counter, and the fetch processing unit 32 and the decode processing unit 33 execute fetch processing and decode processing, which relate to the subsequent next instruction address (Step S82).

Advantageous Effect of Third Embodiment

According to the third embodiment, in the instruction execution CPU 40, it is determined whether or not an emulation execution time taken from the start of the emulation of the decoded instruction to the termination of an instruction subsequent to this instruction is approximate to an execution time taken for the fetch and decode. In addition, as the determination result, when the emulation execution time is approximate to the decode execution time, the instruction address notification unit 45A notifies the instruction decode unit 31 of the instruction address of the instruction subsequent to the decoded instruction.

According to such a configuration, when the emulation execution time is approximate to the decode execution time, it is possible to execute the fetch and decode processing of an instruction next to the instruction subsequent to the decoded instruction. In addition, if the instruction execution CPU 40 collectively executes the emulation processing for the decoded instruction and the instruction subsequent thereto for a fetch and decode processing period, it is possible to reduce a wait time after the emulation processing of the decoded instruction. As a result, the emulation device 3 can speed up the instruction emulation processing.

Incidentally, in the third embodiment, a case has been described in which, even if there is an instruction where the processing amount of the emulation processing itself is light, the emulation device 3 can reduce the wait time of the instruction execution CPU 40 and execute the instruction emulation processing at a fast rate. However, even if there is an instruction where the processing amount of the emulation processing itself is heavy, the emulation device 3 may also reduce the wait time of the fetch/decode CPU 30 and execute the instruction emulation processing at a fast rate. Therefore, a case will be described in which, even if the processing amount of the emulation processing itself is heavy, it is possible to execute the instruction emulation processing at a fast rate. Here, the processing of the related art is compared with the processing of an example of a modification to the third embodiment at the time of the occurrence of a wait time in the fetch/decode CPU 30, with reference to FIGS. 9A and 9B.

FIGS. 9A and 9B are explanatory diagrams comparing the processing of the related art with the processing of an example of a modification to the third embodiment at the time of the occurrence of a wait time in the fetch/decode CPU 30. FIG. 9A is the sequence diagram of the processing of the related art, and FIG. 9B is the sequence diagram of the processing of an example of a modification to the third present embodiment. In addition, it is assumed that alphabets in parentheses indicate instruction addresses. In addition, it is assumed that the instruction of the instruction address B is an instruction where the processing amount of the emulation processing is heavy.

As illustrated in FIG. 9A, in the processing of the related art, the fetch/decode CPU 30 executes the fetch and decode processing of the instruction of the instruction address B (Step S9a), and notifies the instruction execution CPU 40 of instruction information that is a processing result, through an instruction information area. Subsequently, the fetch/decode CPU 30 executes the fetch and decode processing of the instruction of the instruction address C subsequent to the instruction of the instruction address B (Step S9b). At this time, the instruction execution CPU 40 executes emulation processing relating to the instruction address B on the basis of the instruction information (Step S9c). The emulation processing of the instruction of the instruction address B is heavy. Therefore, even if processing relating to the instruction address C has finished, the fetch/decode CPU 30 waits for a long time until the emulation processing in the instruction execution CPU 40 finishes (Step S9d). Accordingly, when there is an instruction where the processing amount of the emulation processing itself is heavy, a long wait time occurs in the fetch/decode CPU 30. Therefore, the instruction emulation processing is interrupted, and it is difficult for the emulation device 3 to execute the corresponding processing at a fast rate.

On the other hand, as illustrated in FIG. 9B, a plurality of instruction information areas 1 to 4 exist in the processing of an example of a modification to the third embodiment. The fetch/decode CPU 30 executes the fetch and decode processing of the instruction of the instruction address B (Step S9*e*), and notifies the instruction execution CPU 40 of instruction information that is a processing result, through an instruction information area 2. In addition, the instruction execution CPU 40 executes emulation processing relating to the instruction address B on the basis of the instruction information stored in the instruction information area 2 (Step S9*f*). At this time, the fetch/decode CPU 30 executes the fetch and decode processing of the instruction of the instruction address C subsequent to the instruction of the instruction address B (Step S9*g*), and notifies the instruction execution CPU 40 of instruction information that is a processing result, through an instruction information area 3. In addition, subsequently, the fetch/decode CPU 30 executes the fetch/decode processing of the instruction of an instruction address D subsequent to the instruction address C without waiting for the termination of the emulation processing of the instruction indicated by the instruction address B (Step S9*h*). In addition, the fetch/decode CPU 30 notifies the instruction execution CPU 40 of instruction information that is a processing result, through an instruction information area 4.

After having executed the emulation processing of the instruction of the instruction address B, the instruction execution CPU 40 executes emulation processing relating to the instruction address C, on the basis of the instruction information stored in the instruction information area 3 (Step S9*i*). In addition, subsequently, the instruction execution CPU 40 executes emulation processing relating to the instruction address D, on the basis of the instruction information stored in the instruction information area 4 (Step S9*j*). In such a way, a plurality of instruction information areas are provided, and hence a long wait time does not occur in the fetch/decode CPU 30 even if there is an instruction where the processing amount of the emulation processing itself is heavy. Therefore, the emulation device 3 can execute the corresponding processing at a fast rate.

Fourth Embodiment

Incidentally, in the emulation device 2 according to the second embodiment, a case has been described in which the fetch/decode CPU 30 is notified of the current instruction address obtained from the emulate result and the address of an instruction subsequent to the instruction of the current instruction address is calculated. The emulation device 2 is not limited to this case. In addition, when the fetch/decode CPU 30 is notified of the current instruction address obtained from the emulation result and the instruction of the current instruction address is a branch instruction, the address of an instruction subsequent to the instruction of the current instruction address may be predicted.

Therefore, in a fourth embodiment, when an emulation device 4 notifies the fetch/decode CPU 30 of the current instruction address obtained from the emulation result and the instruction of the current instruction address is a branch instruction, the address of an instruction subsequent to the instruction of the current instruction address is predicted.

Configuration of Emulation Device According to Fourth Embodiment

Figure 10:
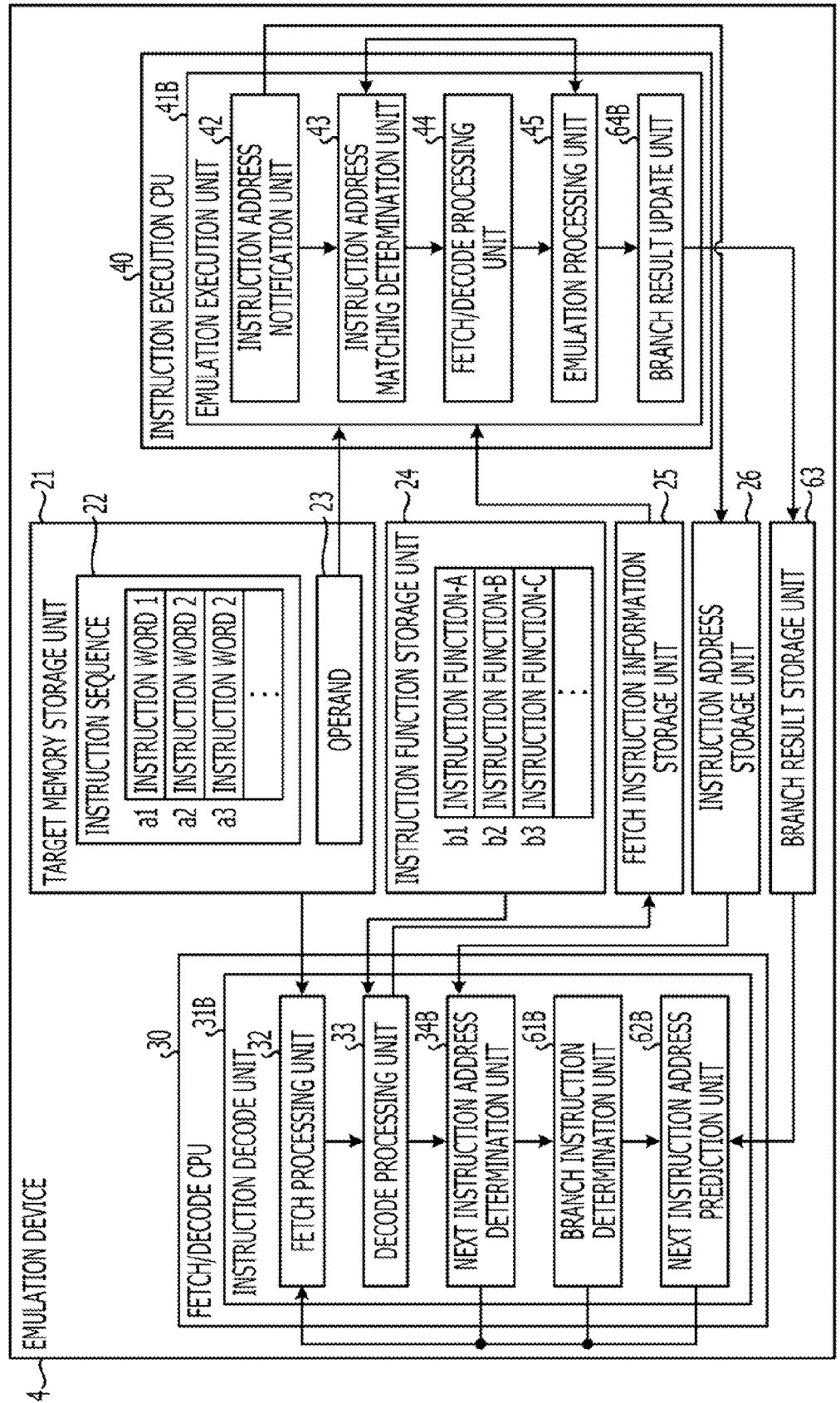
FIG. 10 is a functional block diagram illustrating a configuration of an emulation device according to a fourth embodiment.

FIG. 10 is a functional block diagram illustrating the configuration of an emulation device according to the fourth embodiment. In addition, a same symbol is assigned to the substantially same configuration as the emulation device illustrated in FIG. 4, and hence the redundant configuration and the redundant description of an operation thereof will be omitted. The fourth embodiment differs from the second embodiment in that a branch instruction determination unit 61B and an instruction address prediction unit 62B are added to the instruction decode unit 31B and the next instruction address determination unit 34B is changed. In addition, the fourth embodiment differs from the second embodiment in that the branch result storage unit 63 is added. Furthermore, the fourth embodiment differs from the second embodiment in that a branch result update unit 64B is added to the emulation execution unit 41B.

Figure 11:
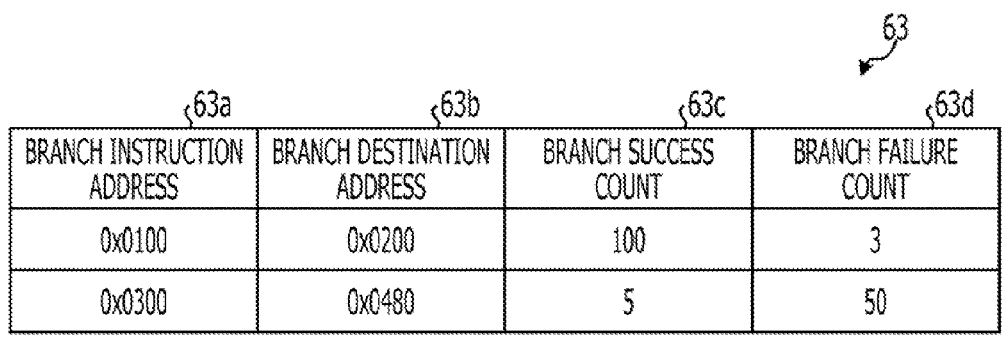
FIG. 11 is a diagram illustrating an example of a data structure of a branch result storage unit.

The branch result storage unit 63 stores therein a branch result in a branch instruction. Here, the branch result storage unit 63 will be described with reference to FIG. 11. FIG. 11 is a diagram illustrating an example of the data structure of the branch result storage unit. As illustrated in FIG. 11, the branch result storage unit 63 stores a branch destination address 63*b*, a branch success count 63*c*, and a branch failure count 63*d* with associating the branch destination address 63*b*, the branch success count 63*c*, and the branch failure count 63*d* with a branch instruction address 63*a*.

The branch instruction address 63*a* is an instruction address indicating a branch instruction. The branch destination address 63*b* is an instruction address to which control is to shift when a branch instruction succeeds in branch. The branch success count 63*c* is the number of times branch has succeeded as the result of the execution of a branch instruction. The branch failure count 63*d* is the number of times branch has failed as the result of the execution of a branch instruction.

When the current instruction is a branch instruction, the branch result update unit 64B updates the branch result of the current instruction. Specifically, when the current instruction is a branch instruction, the branch result update unit 64B determines whether or not branch has succeeded, on the basis of a result subjected to the emulation of the current instruction. In addition, when having determined that branch has succeeded, the branch result update unit 64B adds "1" to the branch success count 63*c* in the branch result storage unit 63 where the current instruction address indicating the current instruction matches the branch instruction address 63*a*. On the other hand, when having determined that branch has failed, the branch result update unit 64B adds "1" to the branch failure count 63*d* in the branch result storage unit 63 where the current instruction address indicating the current instruction matches the branch instruction address 63*a*.

In addition, when the current instruction address indicating the current instruction does not match the branch instruction address 63*a* in the branch result storage unit 63, the branch result update unit 64B adds one record to the branch result storage unit 63. Namely, the branch result update unit 64B regards the branch instruction address 63*a* as the current instruction address, regards the branch destination address 63*b* as a branch destination address calculated from the operand of the current instruction, and adds a record in which the branch success count 63*c* and the branch failure count 63*d* are "0". In addition, the branch result update unit 64B updates the branch result storage unit 63 on the basis of the determination result of the branch result.

The next instruction address determination unit 34B determines whether or not the instruction address of a decoded instruction matches the current instruction address obtained from the execution result of the emulation of a previous instruction. Specifically, the next instruction address determination unit 34B acquires, from the decode processing unit 33, instruction information stored in the fetch instruction information storage unit 25 by the decode processing unit 33. In addition, the next instruction address determination unit 34B reads out the current instruction address that is the instruction address of an instruction to be emulated immediately afterwards, from the instruction address storage unit 26. In addition, the next instruction address determination unit 34B determines whether or not the instruction address 25a included in the instruction information matches the current instruction address. In addition, when the instruction address 25a does not match the current instruction address, the next instruction address determination unit 34B determines that the instruction address obtained from the execution result of the emulation of the previous instruction has been changed on the basis of a predetermined condition. In addition, the next instruction address determination unit 34B calculates the instruction address of an instruction subsequent to an instruction indicated by the current instruction address. In addition, for example, the predetermined condition corresponds to a case in which a previous instruction whose execution result is the current instruction address has been a branch instruction or a case in which interrupt processing has occurred, and in these cases, the effective address is changed.

When it has been determined that the instruction address of the decoded instruction matches the current instruction address, the branch instruction determination unit 61B determines whether or not the corresponding instruction is a branch instruction. In addition, when it has been determined that the decoded instruction is a branch instruction, the branch instruction determination unit 61B requests the next instruction address prediction unit 62B to perform the address prediction of an instruction next to the corresponding instruction. On the other hand, when it has been determined that the decoded instruction is not a branch instruction, the branch instruction determination unit 61B calculates the instruction address of an instruction subsequent to an instruction indicated by the address of the instruction address 25a included in the instruction information. In addition, the branch instruction determination unit 61B holds the calculated instruction address in the program counter.

When the decoded instruction is a branch instruction, the next instruction address prediction unit 62B predicts the instruction address of a next instruction subsequent to the corresponding instruction, on the basis of the branch result storage unit 63. Specifically, when having acquired the address prediction request for the instruction next to the decoded instruction from the branch instruction determination unit 61B, the next instruction address prediction unit 62B reads out, from the branch result storage unit 63, a record matching the instruction address of the corresponding instruction. In addition, when the branch success count 63c of the record read out is greater than the branch failure count 63d, the next instruction address prediction unit 62B determines that the branch of the branch instruction is more likely to succeed, and predicts, as a next instruction address, the branch destination address 63b in the branch result storage unit 63. On the other hand, when the branch success count 63c of the record read out is less than or equal to the branch failure count 63d, the next instruction address prediction unit 62B determines that the branch of the branch instruction is more likely to fail, and predicts, as a next instruction address, the address of the instruction subsequent to the decoded instruction. In addition, when not having read out a record matching the instruction address of the decoded instruction from the branch result storage unit 63, it is difficult for the next instruction address prediction unit 62B to predict a branch destination. Therefore, the next instruction address prediction unit 62B predicts, as a next instruction address, the address of the instruction subsequent to the decoded instruction.

Sequence of Instruction Emulation Processing According to Fourth Embodiment

Figure 12:
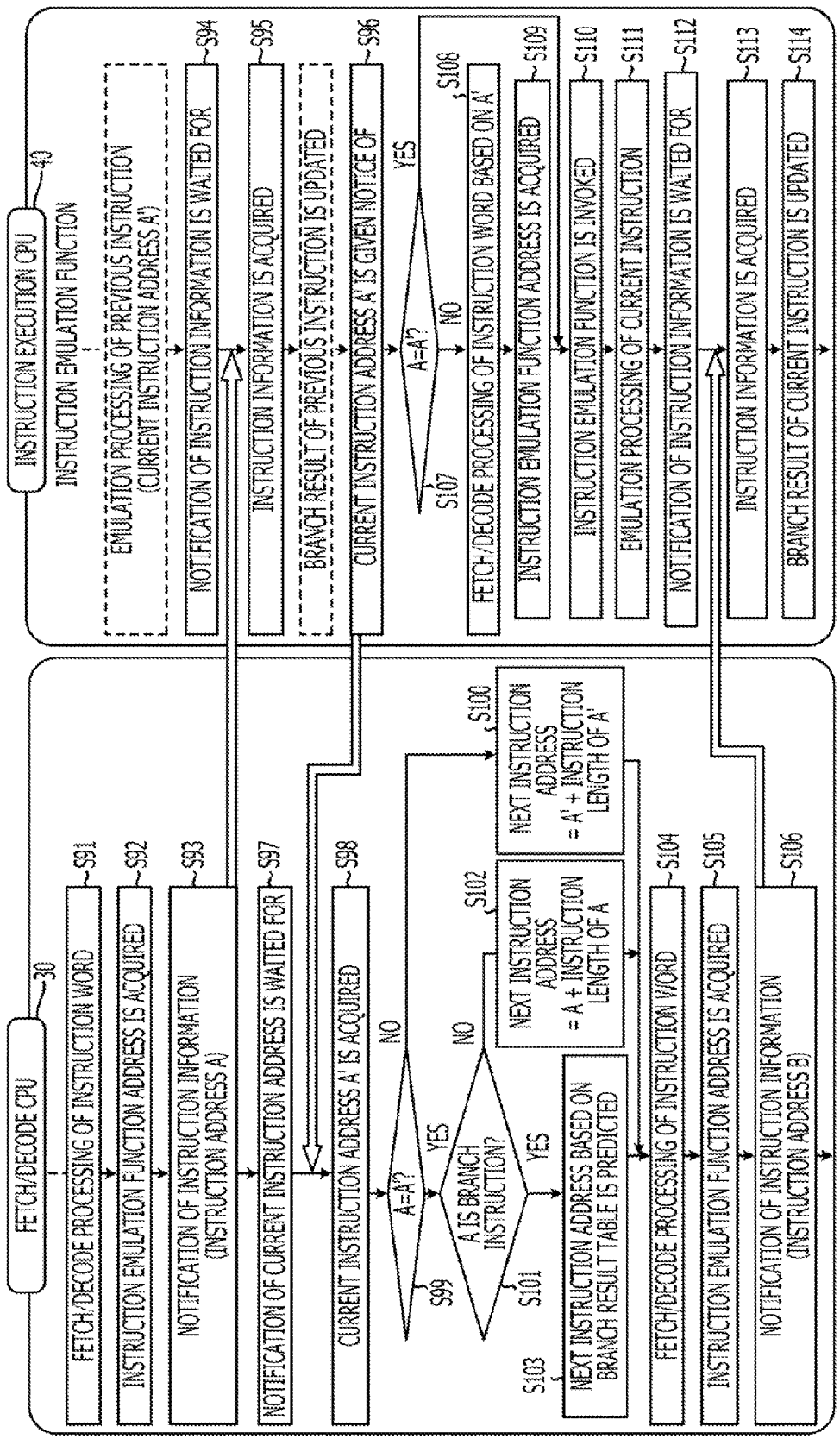
FIG. 12 is a sequence diagram of processing performed in the emulation device according to the fourth embodiment.

Next, the sequence of the instruction emulation processing performed in the emulation device 4 will be described with reference to FIG. 12. FIG. 12 is the sequence diagram of processing performed in the emulation device according to the fourth embodiment. In addition, as illustrated in FIG. 12, it is assumed that the emulation device 4 includes the fetch/decode CPU 30 and the instruction execution CPU 40.

First, the fetch processing unit 32 fetches an instruction word indicated by an instruction address from the instruction sequence 22, in accordance with the program counter, and the decode processing unit 33 decodes the fetched instruction word (Step S91). Here, it is assumed that the instruction address of the instruction fetched by the fetch processing unit 32 is expressed as an "instruction address A". In addition, on the basis of the instruction function storage unit 24, the decode processing unit 33 acquires the address of an instruction emulation function corresponding to the instruction of this instruction word (Step S92). In addition, through the fetch instruction information storage unit 25, the decode processing unit 33 notifies the instruction execution CPU 40 of instruction information including the instruction address A of the fetched instruction word, and the operand information and the address of the instruction emulation function, obtained as the result of decode (Step S93).

Next, the instruction execution CPU waits for the notification of the instruction information, and acquires the instruction information (Steps S94 and S95). In addition, the instruction address notification unit 42 notifies the fetch/decode CPU 30 of a current instruction address obtained from the execution result of the emulation processing of a previous instruction, through the instruction address storage unit 26 (Step S96). Here, it is assumed that the current instruction address is expressed as an "instruction address A'".

On the other hand, in the fetch/decode CPU 30, the next instruction address determination unit 34B waits for the notification of the current instruction address obtained from the execution result of the emulation of the previous instruction (Step S97). In addition, when the next instruction address determination unit 34B has acquired the current instruction address A' (Step S98), it is determined whether or not the instruction address A of the decoded instruction matches the current instruction address A' (Step S99).

When it has been determined that the instruction address A does not match the current instruction address A' (Step S99: No), the next instruction address determination unit 34B calculates the next instruction address by adding the instruction length of an instruction indicated by the current instruction address A' to the corresponding instruction address A' (Step S100).

When it has been determined that the instruction address A matches the current instruction address A' (Step S99: Yes), the branch instruction determination unit 61B determines whether or not the instruction of the instruction address A is a branch instruction (Step S101). When it has been determined that the instruction of the instruction address A is not a branch instruction (Step S101: No), the branch instruction determination unit 61B calculates a next instruction address by adding the instruction length of an instruction indicated by the instruction address A to the current instruction address A (Step S102).

On the other hand, when it has been determined that the instruction of the instruction address A is a branch instruction (Step S101: Yes), the next instruction address prediction unit 62B predicts the instruction address of a next instruction subsequent to the instruction of the instruction address A, on the basis of the branch result storage unit 63 (Step S103). Specifically, the next instruction address prediction unit 62B reads out, from the branch result storage unit 63, a record where the address of the branch instruction address 63a matches the instruction address A. In addition, when the branch success count 63c of the record read out is greater than the branch failure count 63d, the next instruction address prediction unit 62B determines that branch is more likely to succeed, and predicts, as a next instruction address, the branch destination address 63b. In addition, when the branch success count 63c of the record read out is less than or equal to the branch failure count 63d, the next instruction address prediction unit 62B determines that the branch is more likely to fail, and predicts, as a next instruction address, the address of the instruction subsequent to the instruction of the instruction address A. In addition, when not having read out a record matching the instruction address A from the branch result storage unit 63, it is difficult for the next instruction address prediction unit 62B to predict a branch destination. Therefore, the next instruction address prediction unit 62B predicts, as a next instruction address, the address of the instruction subsequent to the instruction of the instruction address A.

Subsequently, the fetch processing unit 32 and the decode processing unit 33 execute fetch processing and decode processing, which relate to the predicted next instruction address (Step S104). Here, it is assumed that the predicted next instruction address is expressed as an "instruction address B". In addition, the decode processing unit 33 acquires the address of an instruction emulation function corresponding to the instruction of the instruction address B (Step S105), and notifies the instruction execution CPU 40 of instruction information relating to the instruction address B (Step S106).

On the other hand, in the instruction execution CPU 40, after the fetch/decode CPU 30 has been notified of the current instruction address A', the instruction address matching determination unit 43 determines whether or not the instruction address A' obtained from the execution result of the emulation of a previous instruction matches the instruction address A (Step S107). In addition, when the instruction address A' matches the instruction address A (Step S107: Yes), the instruction address matching determination unit 43 determines that the previous instruction is not a branch instruction or the like, and shifts to Step S110 so as to cause the emulation processing utilizing the instruction information to be executed.

When the instruction address A' does not match the instruction address A (Step S107: No), the instruction address matching determination unit 43 determines that the previous instruction is a branch instruction or the like, and the fetch/decode processing unit 44 executes the fetch and decode processing of the instruction address A' (Step S108). In addition, on the basis of the instruction function storage unit 24, the fetch/decode processing unit 44 acquires the address of an instruction emulation function corresponding to the instruction of the instruction address A' (Step S109), and creates instruction information.

Subsequently, the emulation processing unit 45 invokes an instruction emulation function indicated by the address of the instruction function address 25c included in the instruction information (Step S110), and executes the emulation processing of the current instruction indicated by the current instruction address A' (Step S111). Here, when the current instruction is a branch instruction, the emulation processing of the branch instruction is executed.

Subsequently, the instruction execution CPU 40 waits for the notification of the instruction information, and acquires the instruction information including the next instruction address B (Steps S112 and 113). In addition, when the current instruction of the current instruction address A' is a branch instruction, the branch result update unit 64B updates the branch result of the current instruction (Step S114). Specifically, when the current instruction of the current instruction address A' is a branch instruction, the branch result update unit 64B determines whether or not branch has succeeded, on the basis of a result subjected to the emulation of the current instruction. In addition, when it has been determined that branch has succeeded, the branch result update unit 64B adds "1" to the branch success count 63c in the branch result storage unit 63 where the current instruction address A' matches the branch instruction address 63a. On the other hand, it has been determined that branch has failed, the branch result update unit 64B adds "1" to the branch failure count 63d in the branch result storage unit 63 where the current instruction address A' matches the branch instruction address 63a.

Advantageous Effect of Fourth Embodiment

According the above-mentioned fourth embodiment, when it has been determined that the instruction address of the instruction decoded by the next instruction address determination unit 34 matches the current instruction address given notice of by the instruction address notification unit 42, the branch instruction determination unit 61 determines whether or not the corresponding instruction is a branch instruction. In addition, when, as the result of the determination performed by the branch instruction determination unit 61, the instruction of the current instruction address is a branch instruction, the next instruction address prediction unit 62 predicts the instruction address of a next instruction subsequent to the corresponding instruction.

According to such a configuration, even if the emulation processing of the instruction of the current instruction address, the instruction being a branch instruction, is executed, it is possible to cause the instruction of an instruction address to be decoded in a prefetch manner, the instruction address being obtained from the execution result of the emulation processing. As a result, even if the instruction of the current instruction address is a branch instruction, the emulation device 4 can reduce the waste of the fetch and decode processing occurring when an instruction subsequent to the branch instruction is fetched unconditionally. Furthermore, when the instruction of the current instruction address is a branch instruction, the emulation device 4 can reduce the overhead of the fetch and decode processing performed on an execution CPU 40 side, the overhead occurring when an instruction subsequent to the branch instruction is fetched unconditionally.

In addition, when the decoded instruction is an unconditional branch instruction, the next instruction address prediction unit 62B may regard, as a next instruction address, a branch destination address obtained by decode, without using the branch result storage unit 63. Accordingly, the next instruction address prediction unit 62B can obtain the next instruction address, and can substantially eliminate the waste of the fetch and decode processing occurring when an instruction subsequent to the unconditional branch instruction is fetched unconditionally.

Program Etc.

In addition, the emulation devices 2 to 4 can be realized by mounting an information processing device such as a personal computer, a workstation, or the like with the above-mentioned individual functions of the instruction decode unit 31, the emulation execution unit 41, and the like.

In addition, the individual configuration elements of each illustrated device are not necessarily required to be physically configured in such a way as illustrated. Namely, a specific embodiment of the distribution or integration of the individual devices is not limited to one of examples illustrated in drawings, and all or part of the individual devices may be functionally or physically integrated or distributed in arbitrary units according to various loads and various statuses of use. For example, the fetch processing unit 32 and the decode processing unit 33 may also be integrated as one unit. On the other hand, the decode processing unit 33 may also be distributed into an instruction decode unit executing the decode of an instruction and an instruction emulation function acquisition unit acquiring the address of an instruction emulation function. In addition, a memory unit such as the target memory unit 21 or the like may also be connected, as the external device of the emulation device 2, through a network.

In addition, various kinds of processing operations described in the above-mentioned embodiments may be realized by executing a preliminarily arranged program in a computer such as a personal computer, a workstation, or the like. Therefore, hereinafter, an example of a computer that executes an emulation processing program having the same function as the emulation device 2 illustrated in FIG. 3 will be described with reference to FIG. 13.

Figure 13:
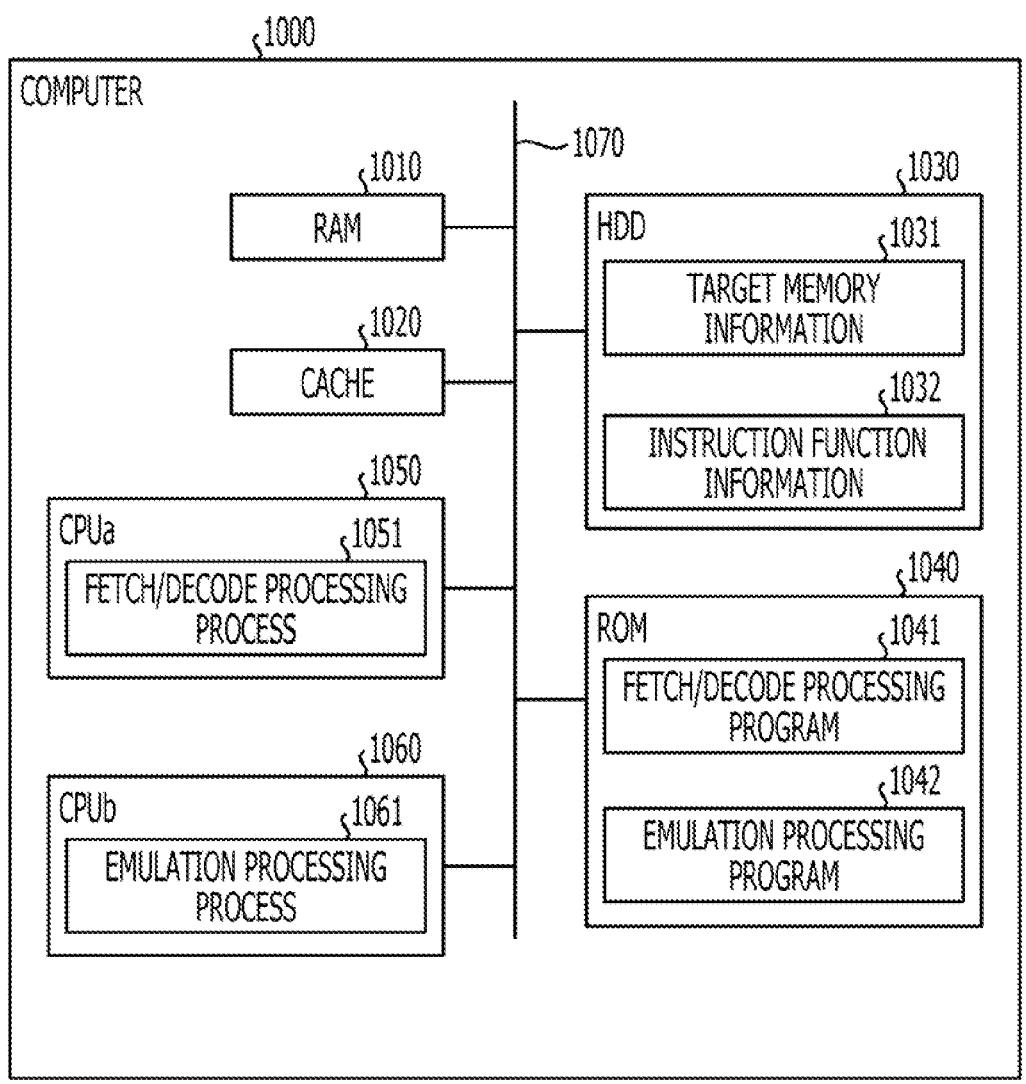
FIG. 13 is a diagram illustrating a computer executing an emulation processing program.

FIG. 13 is a diagram illustrating a computer executing an emulation processing program. As illustrated in FIG. 13, a computer 1000 includes a random access memory (RAM) 1010, a cache 1020, an HDD 1030, a read only memory (ROM) 1040, a Central Processing Unit (CPUa) 1050, a CPUb 1060, and a bus 1070. The RAM 1010, the cache 1020, the HDD 1030, the ROM 1040, the CPUa 1050, and the CPUb 1060 are connected to one another through the bus 1070.

In the ROM 1040, the emulation processing program is preliminarily stored that fulfills substantially the same function as the emulation device 2 illustrated in FIG. 3. Specifically, in the ROM 1040, a fetch/decode processing program 1041 and an emulation processing program 1042 are stored.

In addition, the CPUa 1050 reads out and executes the fetch/decode processing program 1041. The CPUb 1060 reads out and executes the emulation processing program 1042. Accordingly, as illustrated in FIG. 13, the fetch/decode processing program 1041 turns out to be a fetch/decode processing process 1051, and the emulation processing program 1042 turns out to be an emulation processing process 1061. In addition, the fetch/decode processing process 1051 and the emulation processing process 1061 deploy target memory information 1031, information read out from instruction function information 1032, and the like in areas arbitrarily assigned to the fetch/decode processing process 1051 and the emulation processing process 1061 themselves on the RAM 1010. In addition, the fetch/decode processing process 1051 and the emulation processing process 1061 execute various kinds of data processing operations on the basis of this deployed data and the like. In addition, the fetch/decode processing process 1051 corresponds to the instruction decode unit 31 illustrated in FIG. 3, and the emulation processing process 1061 corresponds to the emulation execution unit 41 illustrated in FIG. 3.

In addition, in the HDD 1030, as illustrated in FIG. 13, the target memory information 1031 and the instruction function information 1032 are provided. For example, the target memory information 1031 corresponds to various kinds of data (the instruction sequence 22 and the operand 23) stored in the target memory storage unit 21 illustrated in FIG. 3. For example, the instruction function information 1032 corresponds to data stored in the instruction function storage unit 24 illustrated in FIG. 3.

In addition, the individual programs 1041 and 1042 described above may not be necessarily stored in the ROM 1040. For example, the programs 1041 and 1042 may be stored in a "portable physical medium" such as a flexible disk (FD), a CD-ROM, an MO disk, a DVD disk, a magnetooptical disk, an IC card, or the like, which is inserted into the computer 1000. Alternatively, the programs 1041 and 1042 may be stored in a "fixed physical medium" such as a hard disk drive (HDD) or the like, provided in or out of the computer 1000. Alternatively, the programs 1041 and 1042 may be stored in "another computer (or a server)" connected to the computer 1000 through a public line, Internet, a LAN, a WAN, or the like. In addition, the computer 1000 may acquire and execute individual programs from the above-mentioned flexible disk or the like.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information processing device comprising:
a first processor; and
a second processor,
the first processor including;
a calculation unit to calculate a next instruction address next to a received instruction address, and
a first transmission unit to transmit, to the second processor, the calculated instruction address and instruction information read out on the basis of the calculated instruction address,
the second processor including;
a second transmission unit to transmit, to the first processor, a first instruction address that is an instruction address included in an execution result of executed processing, and
an execution unit to execute processing based on the instruction information received from the first processor, when a second instruction address that is the instruction address received from the first processor is identical to the first instruction address, and reading out instruction information on the basis of the first instruction address and executing processing based on the instruction information read out, when the second instruction address is not identical to the first instruction address.

2. The information processing device according to claim 1, wherein
the instruction information is a storage location address of an emulation function corresponding to an instruction word indicated by the instruction address calculated by the calculation unit.

3. The information processing device according to claim 1, wherein
the execution unit includes
an instruction execution time determination unit to determine whether a first execution time taken from the start of processing of an instruction relating to the second instruction address received from the first processor to the termination of processing of an instruction subsequent to the corresponding instruction is approximate to a second execution time of processing for reading out instruction information on the basis of an instruction address, and
the second transmission unit
transmits, to the first processor, an instruction address of the instruction subsequent to the corresponding instruction when, as a determination result based on the instruction execution time determination unit, the first execution time is approximate to the second execution time.

4. The information processing device according to claim 1, further comprising:
an instruction information storage unit to store a plurality of pieces of instruction information, wherein
the execution unit
sequentially executes an emulation using the plural pieces of instruction information stored in the instruction information storage unit.

5. The information processing device according to claim 1, further comprising:
a branch instruction determination unit to determine whether an instruction of the first instruction address transmitted by the second transmission unit is a branch instruction; and
a next instruction address prediction unit predicting an instruction address of an instruction subsequent to an instruction when the corresponding instruction of the first instruction address is a branch instruction, as a determination result based on the branch instruction determination unit.

6. A computer readable, non-transitory medium storing an emulation processing program, the emulation processing program causing a computer to execute a procedure, the procedure comprising:
causing a computer including a first processor and a second processor to,
calculate a next instruction address next to a received instruction address, and
transmit, to the second processor, the calculated instruction address and instruction information read out on the basis of the calculated instruction address,
transmit, to the first processor, a first instruction address that is an instruction address included in an execution result of executed processing, and
execute processing based on the instruction information received from the first processor, when a second instruction address that is the instruction address received from the first processor is identical to the first instruction address, and read out instruction information on the basis of the first instruction address and execute processing based on the instruction information read out, when the second instruction address is not identical to the first instruction address.

7. An emulation processing method causing a computer including a first processor and a second processor to execute emulation processing, the emulation processing method comprising:
causing a computer to,
calculate a next instruction address next to a received instruction address, and
transmit, to the second processor, the calculated instruction address and instruction information read out on the basis of the calculated instruction address,
transmit, to the first processor, a first instruction address that is an instruction address included in an execution result of executed processing, and
execute processing based on the instruction information received from the first processor, when a second instruction address that is the instruction address received from the first processor is identical to the first instruction address, and read out instruction information on the basis of the first instruction address and execute processing based on the instruction information read out, when the second instruction address is not identical to the first instruction address.

* * * * *